(12) United States Patent
Yamada et al.

(10) Patent No.: US 7,727,620 B2
(45) Date of Patent: Jun. 1, 2010

(54) HEAT-SHRINKABLE LAYERED POLYOLEFIN FILM, HEAT-SHRINKABLE LABEL, AND CONTAINER WITH THE LABEL ATTACHED THERETO

(75) Inventors: Takeyoshi Yamada, Shiga (JP); Kouichirou Taniguchi, Shiga (JP); Hideyasu Miyazaki, Shiga (JP)

(73) Assignee: Mitsubishi Plastics, Inc., Tokyo (JP)

( * ) Notice: Subject to any disclaimer, the term of this patent is extended or adjusted under 35 U.S.C. 154(b) by 581 days.

(21) Appl. No.: 10/599,526

(22) PCT Filed: Mar. 30, 2005

(86) PCT No.: PCT/JP2005/006160
§ 371 (c)(1), (2), (4) Date: Sep. 29, 2006

(87) PCT Pub. No.: WO2005/095106
PCT Pub. Date: Oct. 13, 2005

(65) Prior Publication Data
US 2007/0212539 A1  Sep. 13, 2007

(30) Foreign Application Priority Data

Mar. 31, 2004 (JP) .............................. 2004-103294
May 28, 2004 (JP) .............................. 2004-159336
Mar. 29, 2005 (JP) .............................. 2005-095861

(51) Int. Cl.
B32B 27/32 (2006.01)
(52) U.S. Cl. ...................... 428/212; 428/220; 428/383; 428/411.1; 428/521
(58) Field of Classification Search .................. 428/212, 428/220, 383, 411.1, 521
See application file for complete search history.

(56) References Cited

U.S. PATENT DOCUMENTS

| 7,179,521 | B2 * | 2/2007 | Arthurs et al. | ............... 428/213 |
| 7,244,507 | B2 * | 7/2007 | Arthurs et al. | ............... 428/516 |
| 2002/0192412 | A1 | 12/2002 | Satani et al. | |

FOREIGN PATENT DOCUMENTS

| DE | 19916141 A1 | 10/2000 |
| EP | 1 270 203 A1 | 1/2003 |
| JP | 60-168708 A | 9/1985 |
| JP | 61-115912 A | 6/1986 |
| JP | 61-115916 A | 6/1986 |
| JP | 61-120816 A | 6/1986 |
| JP | 61-271308 A | 12/1986 |
| JP | 61-272216 A | 12/1986 |
| JP | 62-252406 A | 11/1987 |
| JP | 62-252407 A | 11/1987 |
| JP | 2000-202951 A | 7/2000 |
| JP | 2002-052672 A | 2/2002 |
| JP | 2002-234115 A | 8/2002 |
| WO | WO-01/64435 A1 | 9/2001 |
| WO | WO-01/66639 A1 | 9/2001 |

OTHER PUBLICATIONS

International Search Report for PCT/JP2005/006160 completed Jun. 29, 2005.
Patent Abstracts of Japan for JP2000-202951 published Jul. 25, 2000.
Patent Abstracts of Japan for JP2002-234115 published Aug. 20, 2002.
Patent Abstracts of Japan for JP2002-052672 published Feb. 19, 2002.
Patent Abstracts of Japan for JP2001-315260 published Nov. 13, 2001.
Patent Abstracts of Japan for JP60-168708 published Sep. 2, 1985.
Patent Abstracts of Japan for JP61-120816 published Jun. 7, 1986.
Patent Abstracts of Japan for JP61-115912 published Jun. 3, 1986.
Patent Abstracts of Japan for JP61-115916 published Jun. 3, 1986.
Patent Abstracts of Japan for JP61-271308 published Dec. 1, 1986.
Patent Abstracts of Japan for Jp61-272216 published Dec. 2, 1986.
Patent Abstracts of Japan for JP62-252406 published Nov. 4, 1987.
Patent Abstracts of Japan for JP62-252407 published Nov. 4, 1987.

* cited by examiner

*Primary Examiner*—David R Sample
*Assistant Examiner*—Lawrence D Ferguson
(74) *Attorney, Agent, or Firm*—Oblon, Spivak, McClelland, Maier & Neustadt, L.L.P.

(57) ABSTRACT

A heat-shrinkable polyolefin series laminated film having excellent firmness (stiffness at ordinary temperature) of film, resistance to fingerprint bleaching, shrink finishability, transparency and regeneration additivity, with a small natural shrinkage and accurately separable by specific gravity, can be provided by, in a laminated film provided with a surface layer (I) and an intermediate layer (III), forming the surface layer (I) with a mixed resin of cyclic olefin series resin and a polyethylene series resin (A) with a Tm of 80° C. or higher but no greater than 125° C. as a main component, and, forming the intermediate layer (III) with a resin composition having as a main component a cyclic olefin series resin, preferably a mixed resin composition of a cyclic olefin series resin and a polyethylene series resin (C) with a Tm exceeding 125° C. but no greater than 140° C., as a main component.

26 Claims, No Drawings

HEAT-SHRINKABLE LAYERED POLYOLEFIN FILM, HEAT-SHRINKABLE LABEL, AND CONTAINER WITH THE LABEL ATTACHED THERETO

CROSS REFERENCE TO PRIOR APPLICATION

This is a U.S. national phase application under 35 U.S.C. §371 of International Application No. PCT/JP2005/006160 filed Mar. 30, 2005 and claims the benefit of Japanese Applications No. 2004-103294, filed Mar. 31, 2004, 2004-159336, filed May 28, 2004 and 2005-095861, filed Mar. 29, 2005. The International Application was published in Japanese on Oct. 13, 2005 as International Publication No. WO 2005/095106 under PCT Article 21(2).

FIELD OF THE INVENTION

The present invention relates to a heat-shrinkable polyolefin series laminated film containing a polyolefin series resin as the main material and provided with the property of shrinking when heat is applied, a heat-shrinkable label using said film, and a container fitted with said label.

BACKGROUND OF THE INVENTION

Aiming for a differentiation from products of other companies or an increase in the visibility of a product, containers, such as bottles or PET bottles, which are filled with drinks, such as juice, to be sold, are often fitted with a printed heat-shrinkable label on the side of the containers. In so doing, materials, such as from the polystyrene series, the polyester series, the polyvinyl chloride series and the polyolefin series, are used as the material quality for the heat-shrinkable labels used.

In recent years, in order to increase productivity, obtaining an external appearance with a good shrink finish at a low temperature and in a short time in the process of wrapping the label around the bottle, is a requirement for heat-shrinkable labels fitted onto PET bottles and the like. At the same time, the property of a small natural shrinkage ratio is also becoming a requirement. This natural shrinkage is a phenomenon whereby shrinkage occurs gradually inside a warehouse storage at room temperature or in the summer, and if the natural shrinkage ratio is large, sometimes, the film dimensions vary, and, in a rolled state, problems by deformation and the like occur at the time of packaging or at the time of secondary processing.

Meanwhile, recently, from the viewpoints of resource-saving and environmental contamination prevention, along with PET flakes and pellets being increasingly regenerated from PET bottles recovered after use, it is becoming desirable that the specific gravity of the heat-shrinkable label is less than 1.00. The reason is, in the regeneration process of PET bottles, a specific gravity separator and an air separator are used for eliminating heat-shrinkable label grounds from sorted and ground PET bottles, and from the point of view of increasing the processing capability per unit of time, heat-shrinkable labels with a specific gravity of less than 1.00, which can be sorted and eliminated with a specific gravity separator, are desired.

Examples of such heat-shrinkable films with a specific gravity of less than 1.00 include stretched films from polyolefin series resin, such as polyethylene series resin and polypropylene series resin. However, these films have problems, such as insufficient film firmness (stiffness at ordinary temperature) and shrinking properties, and bad shrink finishability due to large natural shrinkage ratio.

As a technique for improving the above problems, for instance, a heat-shrinkable polyolefin series film having a surface layer containing a cyclic olefin series resin and a intermediate layer containing a resin having a polyethylene series copolymer resin as the main component has been disclosed (see for instance Japanese Patent Application Laid-open No. 2001-315260).

However, although this film addresses the problem of lowering the specific gravity, the firmness (stiffness at ordinary temperature) as an entire film is low, in addition, as the cyclic olefin series resin of the surface layer has poor resistance to oil. The film therefore has problems, such as, when an individual touches the surface of the film by hand, oil fat constituents from fingerprints and the like become attached easily, and if heat shrinking is carried out in this state, a phenomenon occurs, giving rise to bleaching and fine cracks (hereinafter referred to as "fingerprint bleaching") in this portion with attached oil fat, decreasing the product value.

In addition a heat-shrinkable polyolefin series film having a surface layer containing, as the main component, a resin in which 60 parts by mass or more but no greater than 150 parts by mass of a linear low density polyethylene resin is mixed with respect to 100 parts by mass of a cyclic olefin series resin, and a intermediate layer containing a propylene-α-olefin random copolymer as the main component has been disclosed (see for instance Japanese Patent Application Laid-open No. 2002-234115).

With the above film, although resistance to the fingerprint bleaching has been improved, compatibility between the cyclic olefin series resin and/or the linear low density polyethylene resin of the surface layer and the propylene-α-olefin random copolymer of the intermediate layer is poor. The film therefore has problems such as, when a recycled resin generated from trimming losses and the like, such as the edges of a film, is added (hereinafter referred to as "regeneration additivity"), sometimes the transparency of the entirety of the film decreases easily, or the interlayer adhesive strength between the surface layer and the intermediate layer is insufficient.

In addition, as the stiffness of polypropylene is generally high, if laminated, there is a tendency to decrease the shrinking properties of the film by preventing the shrinkage of the surface layer (the layer containing cyclic olefin). If stretching at low temperature in order to improve the shrinking properties, there is the problem that shrink finishability worsens, since, in addition to the natural shrinkage becoming too large, decreasing the dimensional stability, the stress at heat-shrinking time becomes also high.

Meanwhile, a heat-shrinkable polyolefin series laminated film resulting from stretching a laminated layer body having a layer containing a polyolefin series resin with a density of less than 0.94 g/cm$^3$, and a layer containing a composition of 70% by mass or more but no greater than 90% by mass of a cyclic olefin series resin and 10% by mass or more but no greater than 30% by mass of a crystalline polyolefin series resin, has been disclosed (see for instance Japanese Patent Application Laid-open No. 2000-202951).

The above film has problems, such as, although the problem of meeting a specific gravity of less than 1.00 (hereinafter referred to as "decreasing the specific gravity") is addressed, as the surface layer is a mixed resin of cyclic olefin and high density polyethylene, due to the difference in the elasticity ratios of the two constituents, surface roughness of the film occurs at stretching time or shrinking time, decreasing transparency. In addition, there are problems, such as, since the firmness (stiffness at ordinary temperature) of the entirety of the film is low, the yield tends to decrease when using a labeling machine and the like to cover a container such as a PET bottle with a film formed into a bag, due to the bottle being covered skewedly, creasing of the film, and the like.

SUMMARY OF THE INVENTION

The present invention was devised to solve the problems of prior art described above, and an object of the present invention lies in providing a heat-shrinkable polyolefin series laminated film having excellent shrinking properties, resistance to fingerprint bleaching, firmness (stiffness at ordinary temperature) of film and transparency, and with reduced natural shrinkage and shrinking stress, a heat-shrinkable labels using said film, and a container fitted with said label.

As a result of earnest studies on layer constitutions using cyclic olefin series resin as the main material, the present inventors discovered that the above problems could be solved by a laminated film having a layer constitution combining a cyclic olefin series resin and a prescribed polyethylene series resin, and reached completion of the present invention.

That is to say, the object of the present invention can be accomplished by a heat-shrinkable polyolefin series laminated film (hereinafter also referred to as "the film of the present invention"), which is a laminated film having a surface layer (I) and at least one intermediate layer (III), with a heat shrinking ratio upon immersion in hot water at 80° C. for 10 seconds of 20% or more in at least one of the directions, wherein the surface layer (I) contains as a main component a mixed resin of a cyclic olefin series resin and a polyethylene series resin (A) in a mass ratio of 90/10 to 50/50, and the intermediate layer (III) contains as a main component a resin composition having as a main component a cyclic olefin series resin.

As the film of the present invention is provided with the above constitutions and properties, excellent firmness (stiffness at ordinary temperature) of film, resistance to fingerprint bleaching, shrink finishability and transparency are obtained, while at the same time, natural shrinkage and shrinking stress can be prevented, allowing a heat-shrinkable polyolefin series laminated film suitable for PET bottle labeling application, and the like, to be provided. In addition, as the film of the present invention is constituted by a cyclic olefin series resin and/or a polyethylene series resin, it can be provided as a heat-shrinkable polyolefin series laminated film, wherein trimming losses and the like, such as the edges of a film, generated in manufacturing process can be re-added as recycled resin (hereinafter, this property is referred to as "regeneration additivity"), and the specific gravity of the film is low, allowing specific gravity separation with good accuracy in PET bottle regeneration process.

DETAILED DESCRIPTION OF THE INVENTION

In the following, a heat-shrinkable polyolefin series laminated film, a heat-shrinkable label using said film (hereinafter also referred to as "label of the present invention"), and a container fitted with said label (hereinafter also referred to as "container of the present invention"), according to two embodiments will be described in detail as embodiments of the present invention. However, the scope of the present invention is not limited to the following embodiments.

In the present specification, "containing as a main component" means allowing inclusion of other components within ranges that do not prevent the actions and effects of the resin constituting each layer. In addition, although this term does not restrict to a concrete content ratio, the component occupies 70% by mass or more of the entirety of the components of each layer, preferably 80% by mass or more, and more preferably 85% by mass or more.

In addition, regarding the upper limit value and the lower limit value of a numerical value range in the present specification, even those cases that are slightly out of the numerical value range specified by the present invention, as long as action effects that are similar to within the numerical value range are provided, are deemed included in an equal range of the present invention.

(Heat-Shrinkable Polyolefin Series Laminated Film According to the First Embodiment)

The film according to the first embodiment is a laminated film provided with a surface layer (I) and an intermediate layer (III), the surface layer (I) containing as a main component a mixed resin of a cyclic olefin series resin and a polyethylene series resin (A) with a Tm of 80° C. or higher but no greater than 125° C., and the intermediate layer (III) containing as a main component a resin composition having as a main component a cyclic olefin series resin, preferably a mixed resin composition of a cyclic olefin series resin and a polyethylene series resin (C) with a Tm exceeding 125° C. but no greater than 140° C.

(Heat-Shrinkable Polyolefin Series Laminated Film According to the Second Embodiment)

The film according to the second embodiment is a laminated film provided with a surface layer (I), an intermediate layer (II), and an intermediate layer (III), the surface layer (I) containing as a main component a mixed resin of a cyclic olefin series resin and a polyethylene series resin (A) with a Tm of 80° C. or higher but no greater than 125° C., the intermediate layer (II) containing as a main component a polyethylene series resin (B) with a Tm of no greater than 125° C., and the intermediate layer (III) containing as a main component a mixed resin of a cyclic olefin series resin and a polyethylene series resin (C) with a Tm exceeding 125° C. but no greater than 140° C.

First, each aforementioned constituent used in the first and second embodiments will be described, then, the constitution and properties, the manufacturing method, and the application for each embodiment will be explained sequentially.

(Cyclic Olefin Series Resin)

Although the cyclic olefin series resin used for the surface layer (I) and the intermediate layer (III) in the first and second embodiments is not limited in particular, the use of a resin wherein ethylene and the cyclic olefin represented by the following General Formula (1) are conjugated is preferred.

[Chem. 1]

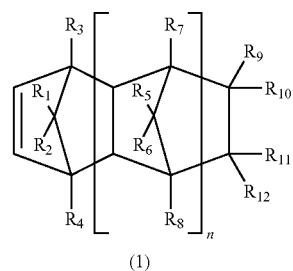

(1)

In General Formula (1), $R_1$ to $R_{12}$ represent hydrogen atoms or hydrocarbon groups, and may individually be identical or different. In addition, $R_5$ and $R_{10}$, or $R_{11}$ and $R_{12}$ may unite to form a divalent hydrocarbon group. In addition, $R_3$ or $R_{10}$ and $R_{11}$ or $R_{12}$ may mutually form a ring. n represents 0 or a positive integer, and in case $R_5$ to $R_8$ are repeated several times, these may individually be identical or different.

As one example of cyclic olefin represented by the above General Formula (1), for instance, the cyclic olefin compound represented by the following General Formula (2) or (3), having a backbone in which n is 0 or 1, may be cited.

[Chem. 2]

(2)

[Chem. 3]

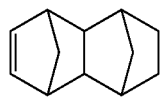

(3)

Concrete examples of cyclic olefin compounds represented by the above General Formulae (1) to (3) include bicyclo[2.2.1]hepto-2-ene derivatives, tetracyclo[4.4.0.1$^{2.5}$.1$^{7.16}$]-3-dodecene derivatives, hexacyclo[6.6.1.1$^{3.6}$.1$^{10.13}$.0$^{2.7}$.0$^{9.14}$]-4-heptadecene derivatives, octacyclo[8.8.0.1$^{2.9}$.1$^{4.7}$.1$^{11.18}$.1$^{13.16}$.0$^{3.8}$.12.17]-5-docosene derivatives, pentacyclo[6.6.1.1$^{3.6}$.0$^{2.7}$.0$^{9.14}$]-4-hexadecene derivatives, heptacyclo-5-eicosene derivatives, heptacyclo-5-heneicosene derivatives, tricyclo[4.3.0.1$^{2.5}$]-3-undecene derivatives, pentacyclo[6.5.1.1$^{3.6}$.0$^{2.7}$.9.13]-4-pentadecene derivatives, pentacyclopentadecadiene derivatives, pentacyclo[7.4.0.1$^{2.5}$.1$^{9.12}$.0$^{3.13}$]-3-pentadecene derivatives, heptacyclo[8.7.0.$^{13.6}$.1$^{10.17}$.1$^{12.16}$.0$^{2.7}$.0$^{11.16}$]-4-eicosene derivatives, nonacyclo[10.9.1.1$^{4.7}$.0$^{13.20}$1$^{15.18}$.0$^{3.8}$.0$^{2.10}$.0$^{12.21}$.0$^{14.19}$]-5-pentacosene derivatives, pentacyclo[8.4.0.1$^{2.5}$.0$^{9.12}$.0$^{8.13}$]-3-hexadecene derivatives, heptacyclo[8.8.0.1$^{4.7}$.1$^{11.18}$.1$^{13.18}$.0$^{3.8}$.0$^{12.17}$]-5-heneicosene derivatives, nonacyclo[10.10.1.1$^{5.8}$.1$^{14.12}$.1$^{18.19}$.0$^{12.22}$.0$^{15.20}$]-5-hexacosene derivatives, cyclopentadiene-acenaphthylene adducts, and the like.

The linking mode between the above cyclic olefin and ethylene can be any among random copolymers, cyclic olefin open-ring (co)polymers, hydrides of a cyclic olefin open-ring (co)polymer, and graft modification products of these (co)polymers, without particular limitation. If the cyclic olefin series resin is a random copolymer of ethylene and cyclic olefin represented by the above General Formulae (1) to (3), the resin may contain an α-olefin other than ethylene, and the resin may contain butadiene, isoprene and the like, as a third constituent. In addition, in this case, the α-olefin may be linear or branched. Preferably, it is an α-olefin with two or more but not greater than 20 carbon atoms. Concrete examples include linear α-olefins with two or more but no greater than 20 carbon atoms, such as, ethylene, propylene, 1-butene, 1-pentene, 1-hexene, 1-octene, 1-decene, 1-dodecene, 1-tetradecene, 1-hexadecene, 1-octadecene, and 1-eicosene; branched α-olefins with 4 or more but no greater than 20 carbon atoms, such as, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene and 3-ethyl-1-hexene, and the like.

Among these, linear α-olefins with two or more but no greater than 4 carbon atoms are preferred, and ethylene is particularly preferred. Such linear or branched α-olefins can be used alone or by combining two or more species.

Concrete examples of the above copolymer of cyclic olefin and ethylene include, for instance, norbornene, 6-methylnorbornene, 6-ethylnorbornene, 6-n-butylnorbornene, 5-propylnorbornene, 1-methylnorbornene, 7-methylnorbornene, 5,6-dimethylnorbornene, 5-phenylnorbornene, 5-benzylicnorbornene, 8-methyltetracyclo-3-dodecene, 8-ethyltetracyclo-3-dodecene, 8-hexyltetracyclo-3-dodecene, 2,10-dimethyltetracyclo-3-dodecene, 5,10-dimethyltetracyclo-3-dodecene and the like.

The above cyclic olefin series resin may additionally use, for instance, a graft modification product modified with a modifier such as unsaturated carboxylic acid or an anhydride thereof, such as, maleic anhydride, maleic acid, itaconic anhydride, itaconic acid and (meta)acrylic acid. These modifiers can be used alone or by combining them.

Such graft modification products of cyclic olefin series polymer can be prepared by combining the above modifier with a cyclic olefin series polymer so as to obtain a desired modification ratio and carrying out graft polymerization; they can also be prepared by preparing beforehand a modification product with a high modification ratio, and then mixing this modification product and the non-modified cyclic olefin series polymer so as to obtain a desired modification ratio.

Well known prior art polymer modification methods can be broadly applied to obtain graft modification products of cyclic olefin series polymers from cyclic olefin series polymers and modifiers. A graft modification product can be obtained, for example, by a method wherein a modifier is added to a cyclic olefin series polymer in a molten state and a graft polymerization (reaction) is carried out, or a reaction wherein a modifier is added to a solvent solution of a cyclic olefin series polymer and a graft reaction is carried out, and the like.

Such a graft reaction is carried in general at a temperature of 60° C. or higher but no greater than 350° C. In addition, the graft reaction can be carried out under the simultaneous presence of radical initiators such as organic peroxides and azo compounds.

The cyclic olefin series resin described above can also be used alone or by mixing two or more species.

The above cyclic olefin series resin has a variety of glass transition temperatures (Tg) according to the type and content of the cyclic olefin series resin included.

It is desirable that the Tg of the above cyclic olefin series resin is 50° C. or higher, preferably 55° C. or higher, and more preferably 60° C. or higher, but no greater than 140° C., preferably no greater than 130° C., and more preferably no greater than 110° C. If the Tg is 50° C. or higher, a film with a satisfactory dimensional stability without exceedingly large natural shrinkage is easier to obtain, which is preferred in terms of practicality. On the other hand, if Tg is no greater than 140° C., by adding a plasticizer, or the like, as necessary, a sufficient heat shrinking ratio can be obtained in a practical temperature region (on the order of 70° C. or higher but no greater than 90° C.), which is preferred.

For the above Tg, measurements were carried out using the viscoelasticity spectrometer DVA-200 (manufactured by IT Keisoku Co., Ltd.) with an oscillation frequency of 10 Hz, a distortion of 0.1%, and a heating rate of 3° C./minute, the peak value of the loss modulus (E") was determined from the data obtained, and the temperature at that time served as Tg.

The above cyclic olefin series resin is preferably a non-crystalline or low-crystalline resin, and the degree of crystallinity as measured by the X-ray diffractometry method is in general 20% or less, preferably 10% or less, and more preferably 2% or less.

For the above cyclic olefin series resin, the limiting viscosity [η] is, as measured in decalin at 135° C., in general 0.01 dl/g or more, preferably 0.03 dl/g or more, and more preferably 0.05 dl/g or more, but no greater than 20 dl/g, preferably no greater than 10 dl/g, and more preferably no greater than 5 dl/g.

In addition, the melt flow rate (MFR) of the above cyclic olefin series resin is not limited in particular; however, in general, those with an MFR (JIS K7210; temperature: 190° C.; load: 21.18N) of 0.2 g/10 min or more, and preferably 0.5 g/10 min or more, but no greater than 10 g/10 min, and preferably no greater than 5 g/10 min are used suitably.

The above cyclic olefin series resin can be manufactured according to well known methods, for instance, Japanese Patent Application Laid-open No. S60-168708, Japanese Patent Application Laid-open No. S61-120816, Japanese Patent Application Laid-open No. S61-115912, Japanese Patent Application Laid-open No. S61-115916, Japanese Patent Application Laid-open No. S61-271308, Japanese Patent Application Laid-open No. S61-272216, Japanese Patent Application Laid-open No. S62-252406, Japanese Patent Application Laid-open No. S62-252407 and the like.

For the above cyclic olefin series resin in both the first and second embodiments, it does not matter whether the same resin is used or different resins are used in the surface layer (I) and the intermediate layer (III); however, those cyclic olefin series resin where a difference exists in the Tg of the cyclic olefin series resins used in the surface layer (I) and the intermediate layer (III), specifically, those cyclic olefin series resin with a Tg difference of on the order of 3° C. or higher but no greater than 20° C., in particular on the order of 5° C. or higher but no greater than 15° C. are preferred. More specifically, if a cyclic olefin series resin with a low Tg is used in the intermediate layer (III) and a cyclic olefin series resin with a high Tg is used in the surface layer (I), or vice-versa, effects such as gentle shrinking behavior is obtained, which is preferred.

Commercially available resins can be used as the above cyclic olefin series resin. Such commercial products include, for example, trade name "ZEONOR" manufactured by Zeon Corporation, trade name "APEL" manufactured by Mitsui Chemicals, trade name "Topas" manufactured by Ticona, and the like.

(Polyethylene Series Resin (A))

The polyethylene series resins (A) used in the surface layer (I) of the first and second embodiments are polyethylene series resins with a crystal melting peak temperature (Tm) of 80° C. or higher as measured with a differential scanning calorimeter (DSC), preferably 85° C. or higher, and particularly preferably 90° C. or higher, among these, particularly preferred are those with a Tm of 95° C. or higher but no greater than 125° C., and preferably no greater than 120° C. If the crystal melting peak temperature (Tm) is 80° C. or higher, the heat resistance of the film surface is sufficiently maintained, and during high temperature heat retention on a bottle fitting line and at a hot beverage sale, problems such as films blocking to each other, and the like, do not occur readily, which is preferred. On the other hand, if the Tm is no greater than 125° C., problems caused at stretching time by the elastic modulus difference between the cyclic olefin series resin and the polyethylene series resin (A), such as, development of asperities on the film surface and decrease in transparency, a so-called external haze, and the like, do not occur readily, which is preferred.

In addition, it is desirable that the density of the polyethylene series resin (A) is 0.890 g/cm$^3$ or more and preferably 0.900 g/cm$^3$ or more, but no greater than 0.940 g/cm$^3$ and preferably no greater than 0.925 g/cm$^3$. If the density is 0.890 g/cm$^3$ or more, the heat resistance of the film surface is maintained, and during high temperature heat retention on a bottle fitting line and at a hot beverage sale, problems such as films blocking to each other, and the like, do not occur readily, which is preferred. On the other hand, if the density is no greater than 0.940 g/cm$^3$, development of problems caused at stretching time by the elastic modulus difference between the cyclic olefin series resin and the polyethylene series resin (A), such as, development of asperities on the film surface (so-called external haze), decrease in transparency, furthermore, difficulty in decreasing the specific gravity of the film overall, and the like, can be prevented, which is preferred.

Concrete examples of polyethylene series resin (A) that fulfill the above conditions include low density polyethylene resin (LDPE), linear low density polyethylene resin (LL-DPE), and the like. In particular, from the points of stretchability, transparency, and the like, the use of linear low density polyethylene resin (LLDPE) is preferred.

Examples of the above linear low density polyethylene resin (LLDPE) include copolymers of ethylene and α-olefin with 3 or more but no greater than 20 carbons, preferably 4 or more but no greater than 12 carbons. Examples of α-olefin in this case include propylene, 1-butene, 1-pentene, 1-hexene, 1-heptene, 1-octene, 1-nonene, 1-decene, 3-methyl-1-butene, 4-methyl-1-pentene and the like, among which, 1-butene, 1-hexene, 1-octene are preferred. The α-olefin to be copolymerized may be used alone as one species, or by combining two or more species.

The melt flow rate (MFR) of the polyethylene series resin (A) is not limited in particular, and in general, those with an MFR (JIS K7210; temperature: 190° C.; load: 21.18N) of 1.0 g/10 min or more and preferably 1.5 g/10 min or more, but no greater than 15 g/10 min and preferably no greater than 10 g/10 min, are used suitably.

Here, it suffices to select MFR by taking into consideration the knead dispersibility with the cyclic olefin series resin used, forming processability and the like, and, for instance, from the point of view of obtaining satisfactory transparency and knead dispersibility, selecting one that is close to the MFR converted from the viscosity at melt knead time of the cyclic olefin series resin is preferred. The method for manufacturing the above polyethylene series resin (A) is not limited in particular, and well known polymerization methods using well known catalysts for olefin polymerization, for instance, slurry polymerization method, solution polymerization method, mass polymerization method, gas phase polymerization method, and the like, which use multi-site catalysts represented by Ziegler-Natta type catalysts and single site catalysts represented by the metallocene series catalysts, and in addition, mass polymerization method, and the like, which use radical initiators, may be cited.

The polyethylene series resin (A) described above may be used alone as one species, or by mixing two or more species.

In the present invention, when two or more species of polyethylene series resins are mixed and used, if a plurality of crystal melting peak temperatures (Tm) exist, the highest temperature with the largest mixed mass ratio is the crystal melting peak temperature (same for each layer).

(Polyethylene Series Resin (B))

The polyethylene series resin (B) used in the intermediate layer (II) of the second embodiment is a polyethylene series resin with a crystal melting peak temperature (Tm) of no greater than 125° C. as measured with a differential scanning calorimeter. If the Tm is no greater than 125° C., a film with stretchability maintained at low temperature and with excellent transparency can be readily obtained, which is preferred.

Although the lower limit value of the crystal melting peak temperature (Tm) is not limited in particular, in order to avoid decreasing significantly the heat resistance and stiffness (firmness) of the entirety of the film, a lower limit of 50° C. or higher, preferably 70° C. or higher, and more preferably 90° C. or higher, is desirable.

It is preferred that the density of the above polyethylene series resin (B) is 0.940 g/cm$^3$ or less. If the density is 0.940 g/cm$^3$ or less, stretchability at low temperature is maintained, and a sufficient heat shrinking ratio is obtained in the practical temperature region (on the order of 70° C. or higher but no greater than 90° C.), which is preferred. On the other hand, although the lower limit value of the density of the polyethylene series resin (B) is not limited in particular, from the point of view of not decreasing significantly the heat resistance and firmness (stiffness at ordinary temperature) of the entirety of the film, a density of 0.865 g/cm$^3$ or more, preferably 0.875 g/cm$^3$ or more, and more preferably 0.900 g/cm$^3$ or more, is desirable.

Although the melt flow rate (MFR) of the above polyethylene series resin (B) is not limited in particular, in general, those with an MFR (JIS K7210; temperature: 190° C.; load: 21.18N) of 11.0 g/10 min or more, preferably 1.5 g/10 min or more, but no greater than 15 g/10 min and preferably no greater than 10 g/10 min, are used. For the MFR of the polyethylene series resin (B), selecting one that is similar to the MFR converted from the viscosity at melt time of the surface layer (I) and the intermediate layer (III) is preferred from the point of view of obtaining a film with a uniform thickness.

Concrete examples of polyethylene series resin (B) that fulfill the above conditions include low density polyethylene resin (LDPE), linear low density polyethylene resin (LLDPE) and the like, and from the points of view of stretchability, transparency and the like, linear low density polyethylene resin (LLDPE) is used suitably.

The above straight low density polyethylene series resin (LLDPE) is a copolymer of ethylene and an α-olefin with 3 or more but no greater than 20 carbons and preferably 4 or more but no greater than 12 carbons. Examples of α-olefin include, for instance, propylene, 1-butene, 1-pentene, 1-hexene, 1-heptene, 1-octene, 1-nonene, 1-decene, 3-methyl-1-butene, 4-methyl-1-pentene and the like, among which 1-butene, 1-hexene, 1-octene are preferred. The α-olefin to be copolymerized may be used alone as one species, or by combining two or more species.

The method for manufacturing the above polyethylene series resin (B) is not limited in particular, and well known polymerization methods using well known catalysts for olefin polymerization, for instance, slurry polymerization method, solution polymerization method, mass polymerization method, gas phase polymerization method, and the like, which use multi-site catalysts represented by Ziegler-Natta type catalysts and single site catalysts represented by the metallocene series catalysts, and in addition, mass polymerization method, and the like, which use radical initiators, may be cited.

The polyethylene series resin (B) described above may be used alone as one species, or by mixing two or more species.

(Polyethylene Series Resin (C))

For the polyethylene series resin (C) used in the first and second embodiments intermediate layer (III), one with a crystal melting peak temperature (Tm) as measured with a differential scanning calorimeter (DSC) that is higher than the above polyethylene series resin (A) or the above polyethylene series resin (B) is preferred. Specifically, a polyethylene series resin with a crystal melting peak temperature (Tm) exceeding 125° C., preferably 130° C. or higher, but no greater than 140° C., is suitably used. If the Tm exceeds 125° C., it is preferable on the points that the film can be made to have a high degree of firmness (stiffness at ordinary temperature), and furthermore, the transparency can be maintained satisfactorily. On the other hand, if Tm is no greater than 140° C., stretchability at low temperature is maintained, and a sufficient heat shrinking ratio can be obtained in the practical temperature region (on the order of 70° C. or higher but no greater than 90° C.), which is preferred.

For the density of the polyethylene series resin (C), those that are higher than the above polyethylene series resin (A) or polyethylene series resin (B) are preferred, among which those that are higher than the above polyethylene series resin (A) and polyethylene series resin (B) are more preferred. Specifically, densities of 0.935 g/cm$^3$ or more, in particular, exceeding 0.940 g/cm$^3$ but no greater than 0.970 g/cm$^3$ are preferred, among which high density polyethylene series resins (HDPEs) exceeding 0.945 g/m$^3$ but no greater than 0.965 g/cm$^3$ are all the more preferred. If the density is 0.935 g/cm$^3$ or more, it is preferable on the points that the film can be made to have a high degree of firmness (stiffness at ordinary temperature), and furthermore, the transparency can be made satisfactory. On the other hand, if the density is no greater than 0.970 g/cm$^3$, stretchability at low temperature is maintained, and a sufficient heat shrinking ratio can be obtained in the practical temperature region (on the order of 70° C. or higher but no greater than 90° C.), which is preferred.

Although the melt flow rate (MFR) of the above polyethylene series resin (C) is not limited in particular, those with an MFR (JIS K7210; temperature: 190° C.; load: 21.18N) of 1.0 g/10 min or more, preferably 1.5 g/10 min or more, but no greater than 15 g/10 min and preferably no greater than 10 g/10 min, are suitably used. Here, the MFR of the polyethylene series resin (C) can be selected suitably by taking into consideration the knead dispersibility with the cyclic olefin series resin to be used, the forming processability and the like, and in order to obtain satisfactory transparency and knead dispersibility, selection of MFR that may approximate the viscosity of cyclic olefin series resin is preferred.

The method for manufacturing the above polyethylene series resin (C) is not limited in particular, and well known polymerization methods using well known catalysts for olefin polymerization, for instance, polymerization methods using multi-site catalysts represented by Ziegler-Natta type catalysts and single site catalysts represented by the metallocene series catalysts, and the like, may be cited.

The polyethylene series resin (C) described above may be used alone as one species, or by mixing two or more species.

In both the first embodiment and the second embodiment, either or both of a low molecular compound (D) and hydrocarbon resins can be included in either one layer, or two or more layers from the surface layer (I), the intermediate layer (II) and the intermediate layer (III).

(Low Molecular Compound)

In the first embodiment and the second embodiment, by including a low molecular compound (D) in either one layer, or two or more layers from the surface layer (I), the intermediate layer (II) and the intermediate layer (III), an improvement of film stretchability and shrinking properties and a decrease in shrinking stress can be anticipated.

For the low molecular compound (D), a plasticizer with a number average molecular weight of overall 10,000 or less, having a molecular weight in the range of 5,000 or less in general, that is to say, a compound provided with the function of decreasing the glass transition temperature (Tg) of the resin it is added to, and one that is compatible to the extent that, when included in each layer, no separation arises in terms of external appearance, and in particular, having some degree of compatibility in a transparent to translucent state, is preferred. Specifically, those that are known in general as plasticizers for vinyl chloride resin, that is to say, phthalic acid series plasticizers such as di-n-butyl phthalate, di-2-ethylhexyl phthalate, di-n-octyl phthalate, diiso-octyl phthalate, octyldecyl phthalate, diisodecyl phthalate, butylbenzyl phthalate and di-2-ethylhexyl isophthalate, aliphatic ester series plasticizers such as di-2-ethylhexyl adipate, di-n-decyl adipate, diisodecyl adipate, dibutyl sebacate and di-2-ethylhexyl sebacate, trimellitic acid series plasticizers such as trioctyl trimellitate and tridecyl trimellitate, pyromellitic acid series plasticizers such as tetraoctyl pyromellitate, phosphoester series plasticizers such as tributyl phosphate, tri-2-ethylhexyl phosphate, 2-ethylhexyldiphenyl phosphate and tricresyl phosphate, aliphatic dibasic acid esters such as dioctyladipate and dioctylsebacate, epoxy series plasticizers such as epoxidized soybean oil, epoxidized linseed oil, epoxidized castor oil, epoxidized sunflower oil, epoxy stearic acid ester and dioctyl epoxyhexahydrophthalate, liquid polybutene, liquid polybutadiene, liquid polyisoprene, liquid hydrogenated polybutadiene, liquid hydrogenated polyisoprene, liquid isobutylene-isoprene rubber, liquid paraffin and the like, may be cited as examples. Among them, from the point of view of compatibility, at least one species chosen from liquid polybutene, liquid polybutadiene, liquid polyisoprene, liquid hydrogenated polybutadiene, liquid hydrogenated polyisoprene, and liquid paraffin can be used suitably. In addition, the above low molecular compound may be used alone or by combining two or more species.

Regarding the quantity of the above low molecular compound (D) to be added, inclusion can be within the ranges of one part by mass or more and preferably two parts by mass or more, but no greater than 15 parts by mass and preferably no greater than 10 parts by mass with respect to 100 parts by mass of resin constituting each layer. If the content of the low molecular compound (D) is one part by mass or more with respect to 100 parts by mass of resin constituting each layer, stretchability of the form is satisfactory, and low temperature shrinking properties of the film and shrinking stress are suppressed sufficiently, which is preferred. On the other hand, if the content is 15 parts by mass or less, the decrease in impact resistance can be prevented while preventing the film surface from bleeding over time and the films from blocking to each other, which is preferred.

For the above low molecular compound (D), commercially available products can be used. Examples of such commercially available product include trade names "Nisseki Polybutene" and "Nippon Polybutadiene" manufactured by Nippon Petrochemicals Co., Ltd., trade name "Adecasizer" manufactured by Asahi Denka Co., Ltd., trade name "Diana Process Oil" manufactured by Idemitsu Kosan Co., Ltd., and the like.

(Hydrocarbon Resins)

In addition, in the first embodiment and the second embodiment, hydrocarbon resins can be included in any one layer, or two or more layers among the surface layer (I), the intermediate layer (II) and the intermediate layer (III), as necessary. The effect of improving glossiness of the film surface and shrinking properties can be obtained by including hydrocarbon resins in the surface layer (I), and furthermore, improvement of stretchability and shrinking properties can be anticipated by inclusion in the intermediate layer (II) and/or intermediate layer (III).

Examples of the above hydrocarbon resins include, for instance, petroleum resins exemplified by alicyclic petroleum resins from cyclopentadiene or from a dimer thereof, aromatic petroleum resins from C9 constituent, and the like, in addition, terpene resins exemplified by terpene resins and terpene-phenol resins from β-pinene, and the like, in addition, rhodine series resins exemplified by rhodine resins such as gum rhodine and wood rhodine, and esterified rhodine resins modified with glycerin, pentaerythritol or the like.

When the hydrocarbon resins are any among petroleum resins, terpene series resins, rhodine series resins or hydrogenated products thereof, resins having a variety of softening temperatures corresponding to the molecular weights thereof exist, and those with a softening temperature of 100° C. or higher and preferably 110° C. or higher, but no greater than 150° C. and preferably no greater than 140° C. are suitably used. If the softening temperature of the hydrocarbon resins is 100° C. or higher, when mixing with the above mixed resin of cyclic olefin series resin and polyethylene series resin and/or polyethylene series resin, bleeding to the film surface over time leading to blocking, and decrease of the mechanical strength of the entirety of the film leading to easy tearing, are prevented, which is preferred on a practical level. On the other hand, if the softening temperature is no greater than 150° C., a satisfactory compatibility with mixed resin of cyclic olefin series resin and polyethylene series resin and/or polyethylene series resin is maintained, allowing occurrence of blocking and decrease in transparency over time to be prevented.

It is desirable that the content of the above hydrocarbon resins in each layer is in the ranges of two parts by mass or more and preferably 5 parts by mass or more, but no greater than 40 parts by mass, preferably no greater than 25 parts by mass, in particular no greater than 20 parts by mass, and particularly among these, no greater than 15 parts by mass, with respect to 100 parts by mass of resin that is the main component of each layer. If the content of hydrocarbon resins is two parts by mass or more, an effect of improvement of the glossiness of the film surface and shrinking properties can be obtained, which is preferred. On the other hand, if the content of the hydrocarbon resins is 40 parts by mass or more, problems such as bleeding to the film surface over time and films blocking to one another, and decrease in impact resistance can be prevented.

For the above hydrocarbon resins, commercially available products can be used, and, specifically, commercially available products such as trade names "Hi-rez" and "Petrosine" from Mitsui Chemicals, Inc., trade name "Arkon" from Arakawa Chemical Industries, Ltd., trade name "Clearon" from Yasuhara Chemical Co., Ltd., trade name "I-MARV" from Idemitsu Kosan Co., Ltd., and trade name "Escorez" from Tonex Co., Ltd., can be cited.

(Other Additives)

Furthermore, in addition to the constituents described above, recycle resin generated from trimming loss and the like, such as the edges of a film (in particular, addition to the intermediate layer (III) is preferred), and, except for polyolefin series elastomer and polyolefin series resin, for instance, resins such as styrene series elastomer, inorganic particles such as silica, talc, kaolin and calcium carbonate, pigments such as titanium oxide and carbon black, additives such as fire retardant, weather resistant stabilizer, heat resistant stabilizer, antistatic agent, molten viscosity improver, crosslinking agents, lubricant, nucleator, plasticizer and anti-aging agent, may be included suitably, in any one layer, or two or more layers among the surface layer (I), the intermediate layer (II) and the intermediate layer (III) in the first embodiment as well as in the second embodiment, within ranges that do not inhibit noticeably the effects of each layer, in order to improve/adjust forming processability, productivity, various physical properties of the heat-shrinkable film, and the like.

First Embodiment

The film according to the first embodiment, as described above, is a heat-shrinkable polyolefin series laminated film, which is a laminated film provided with a surface layer (I) and an intermediate layer (III), the surface layer (I) containing as a main component a mixed resin of a cyclic olefin series resin and a polyethylene series resin (A) with a Tm of 80° C. or higher but no greater than 125° C., and the intermediate layer (III) containing as a main component a mixed resin composition of a resin composition having as a main component a cyclic olefin series resin, preferably a cyclic olefin series resin, and a polyethylene series resin (C) with a Tm exceeding 125° C. but no greater than 140° C.

The main component of the surface layer (I) in the first embodiment is preferably a mixed resin composition containing the above cyclic olefin series resin and the above polyethylene series resin (A) mixed with a mass ratio of 90/10 to 50/50.

Herein, considering the content of the mixed resin constituting the main component of the surface layer (I) as 100 parts by mass, if the content of the polyethylene series resin (A) is 10 parts by mass or more, the effect of suppressing the fingerprint bleaching phenomenon occurring at heat shrinking time becomes prominent, and furthermore, decreasing the specific gravity of the entirety of the film is easy, which is preferred. On the other hand, if the content of the polyethylene series resin (A) is no greater than 50 parts by mass, a film with excellent transparency and small natural shrinkage ratio is readily obtained, and furthermore, the adhesiveness of ink when printing on the film is satisfactory, which are preferred points.

From the above, the mass ratio of the cyclic olefin series resin and the polyethylene series resin (A) in the surface layer (I) is more preferably 80/20 to 60/40.

Meanwhile, the main component of the intermediate layer (III), is preferably a mixed resin containing the above cyclic olefin series resin and the above polyethylene series resin (C) mixed with a mass ratio of 95/5 to 50/50.

Herein, considering the content of the mixed resin constituting the main component of the surface layer (III) as 100 parts by mass, if the content of the polyethylene series resin (C) is 5 parts by mass or more, a decrease in the specific gravity of the film and sufficient effects to improve impact resistance and economic efficiency can be obtained. On the other hand, if the content of the polyethylene series resin (C) is no greater than 50 parts by mass, a film with excellent transparency and small natural shrinkage ratio is readily obtained, and furthermore, stretchability at low temperature can be maintained, and sufficient heat shrinking ratio can be obtained in a practical temperature region (on the order of 70° C. or higher but no greater than 90° C.), which is preferred.

From the above, the mass ratio of the cyclic olefin series resin and the polyethylene series resin (C) in the intermediate layer (III) is more preferably 75/25 to 50/50.

The heat-shrinkable polyolefin series laminated film of the first embodiment is not limited in particular as long as it is at least of a constitution having no less than 3 layers including the surface layer (I) and the intermediate layer (III). For instance, a five layer constitution, or the like, further layering a layer (L layer) containing the polyethylene series resin (A) described above, and containing surface layer (I)/L layer/ intermediate layer (III)/L layer/reverse side layer (I), or, surface layer (I)/intermediate layer (III)/L layer/intermediate layer (III)/reverse side layer (I) can also be cited as examples of preferred constitutions for decreasing the specific gravity of the film and further improving the low temperature characteristics.

Herein, if the film having the three-layer constitution containing the surface layer (I) and the intermediate layer (III) is to be explained, the ratio of thickness of each layer suffices to be set taking into consideration the effects and actions described above, and is not limited in particular. However in the present embodiment, it is desirable to set a surface layer (I)/intermediate layer (III)/reverse side layer (I) thickness ratio of 1/3/1 to 1/12/1, and more preferably of 1/4/1 to 1/10/1. Herein, considering the ratio of thickness of the surface layer (I) or the reverse side layer (I) to be one, if the ratio of thickness of the intermediate layer (III) is 3 or more, the film does not deteriorate easily in firmness (stiffness at ordinary temperature) and transparency. On the other hand, if the previous ratio of thickness is no greater than 12, the specific gravity of the entirety of the film can readily become less than 1.00, which is preferred.

Although the thickness of the heat-shrinkable polyolefin series laminated film of the first embodiment is not limited in particular, the thickness is in general 5 μm or more but no greater than 100 μm and preferably 20 μm or more but no greater than 80 μm. Herein, if the thickness is 5 μm or more, the handling ability of the film is satisfactory, on the other hand, if it is no greater than 100 μm, transparency and shrink processability are excellent, which is also economically preferred. In addition, as necessary, surface treatments and surface processing, such as corona treatment, printing, coating and vapor deposition, furthermore, bag forming processing by various solvents and heat sealing, perforation processing and the like can be carried out.

In general, the transparency of the heat-shrinkable polyolefin series laminated film of the first embodiment is, in terms of total haze, preferably 10% or less, more preferably 7% or less, and even more preferably 5% or less. Herein, if the total haze is 10% or less, a clear display effect can be obtained, which is preferred.

It is important that the specific gravity of the film of the first embodiment is less than 1.00, preferably 0.98 or less, and in particular 0.97 or less. In order to bring the specific gravity of the film to less than 1.00, and in particular to 0.98 or less, it suffices to adjust suitably, for instance, the content of the cyclic olefin series resin and the polyethylene series resin (A) or (C) used in each layer according to the ratio of the mixed composition and the thickness constitution ratio of each layer. As the density of a cyclic olefin series resin is, in general, on the order of 0.99 g/cm$^3$ or more but no greater than 1.05 g/cm$^3$, in addition, as described above, the density of the polyethylene series resin (A) preferably used is 0.890 g/cm$^3$ or more but no greater than 0.940 g/cm$^3$, and the density of the polyethylene series resin (C) exceeds 0.935 g/cm$^3$ but is no greater than 0.970 g/cm$^3$, it suffices to design suitably by integrating these densities and contents, with the proviso that the method for bringing the specific gravity of the film of the first embodiment to less than 1.00, and in particular to 0.98 or less, is not limited to such methods.

The specific gravity of the film of the present invention can be measured according to JIS K7112.

The firmness (stiffness at ordinary temperature) of the heat-shrinkable polyolefin series laminated film of the first embodiment, in terms of storage modulus (E'), is preferably 1000 MPa or more, more preferably 1300 MPa or more, and particularly preferably 1500 MPa or more. In addition, the upper limit value of the storage modulus (E') of a heat-shrinkable film used in general is on the order of 2500 MPa. Herein, if the storage modulus is 1000 MPa or more, the firmness (stiffness at ordinary temperature) of the entirety of the film being strong, in particular, when the thickness of the film is thin, problematic points, such as, the yield decreasing readily when using a labeling machine and the like to cover a container such as a PET bottle with a film formed into a bag, due to the bottle being covered skewedly, creasing of the film, and the like, do not arise readily, which is preferred.

The storage modulus (E') used in the first embodiment can be determined in the following way. That is to say, the value of the storage modulus (E') at 25° C. can be calculated from data obtained by measurements using the viscoelasticity spectrometer DVA-200 (manufactured by IT Keisoku Co., Ltd.) with an oscillation frequency of 10 Hz, a distortion of 0.1% and a heating rate of 3° C./minute.

In addition, it is important for the heat-shrinkable polyolefin series laminated film of the first embodiment, that the heat shrinking ratio upon immersion for 10 seconds in hot water at 80° C. is 20% or more in at least one of the directions. This serves as an indicator for deciding the applicability to a relatively short time (on the order of few seconds to ten and few seconds) shrink manufacturing process such as shrink label application onto PET bottles. For instance, although the necessary shrinking ratio required of a heat-shrinkable film used in shrink label application of PET bottle varies depending on the shape thereof, it is generally on the order of 20% or more but not exceeding 70%.

As the shrink processing machine most used in the industry currently for PET bottle label fitting application, a machine generally called a steam shrinker exists, which uses water vapor as a medium to carry out shrink processing. From such viewpoint as the influence of the heat on the object to be wrapped, the heat-shrinkable film furthermore must be heat shrunk sufficiently at a temperature that is as low as possible. Taking such industrial productivity also into consideration, if the film has a heat shrinking ratio of 20% or more in the above conditions, the film can come in sufficiently tight contact with the object to be wrapped within the shrink processing time, which is preferred.

From the above, a heat shrinking ratio in at least one of the directions upon immersion for 10 seconds in hot water at 80° C., in general, of 30% or more but no greater than 70%, and in particular of 40% or more but no greater than 70%, in the main shrinking direction, is preferred.

In addition, in a PET bottle shrink labeling application, the heat shrinking ratio in the direction orthogonal to the main shrinking direction upon immersion for 10 seconds in hot water at 80° C. is preferably 10% or less, and more preferably 7% or less. Herein, if the film has a heat shrinking ratio of 10% or less in the direction orthogonal to the main shrinking direction, problems such as shortening of the dimension per se in the direction orthogonal to the main shrinking direction after shrinking, distortion and the like occurring readily in print motifs and texts after shrinking, and longitudinal shrinkage in case of angled bottles, do not occur readily, which is preferred.

It is desirable that the natural shrinkage ratio of the heat-shrinkable polyolefin series laminated film of the first embodiment is as small as possible, and generally, if the natural shrinkage ratio of the heat-shrinkable film is, for instance, less than 2.0% under the conditions of at 30° C. on the order of for 30 days, practical problems do not readily occur. Less than 1.5% is a more preferred ratio.

Second Embodiment

The film according to the second embodiment, as described above, is a heat-shrinkable polyolefin series laminated film, which is a laminated film provided with a surface layer (I), an intermediate layer (II) and an intermediate layer (III), the surface layer (I) containing as a main component a mixed resin of a cyclic olefin series resin and a polyethylene series resin (A) with a Tm of 80° C. or higher but no greater than 125° C., the intermediate layer (II) having as a main component a polyethylene series resin (B) with a Tm of no greater than 125° C., and the intermediate layer (III) containing a mixed resin of a cyclic olefin series resin, and a polyethylene series resin (C) with a Tm exceeding 125° C. but no greater than 140° C.

As the proportion of the content occupied by the cyclic olefin series resin in the intermediate layers (II) and (III) can be decreased by providing an intermediate layer (II), resistance to rupture can be increased in addition to decreasing all the more the specific gravity, and less expensive manufacturing is possible.

The main component of the surface layer (I) in the second embodiment is preferably a mixed resin containing the previous cyclic olefin series resin and the previous polyethylene series resin (A) mixed with a mass ratio of 90/10 to 50/50.

Considering the mixed resin constituting the main component of the surface layer (I) as 100 parts by mass, if the content of the polyethylene series resin (A) is 10 parts by mass or more, the effect of suppressing the fingerprint bleaching phenomenon occurring at heat shrinking time becomes prominent, and furthermore, decreasing the specific gravity of the entirety of the film is easy, which is preferred. On the other hand, if the content of the polyethylene series resin (A) is no greater than 50 parts by mass, a film with excellent transparency and small natural shrinkage ratio is readily obtained, and the adhesiveness of ink when printing on the film is satisfactory, which is preferred.

From the above, the resin used in the surface layer is all the more preferably a mixed resin containing the previous cyclic olefin series resin and the previous polyethylene series resin (A) mixed in a mass ratio of 80/20 to 60/40. The mixed resin constituting the main component of the intermediate layer (III) of the second embodiment is preferably a mixed resin containing the previous cyclic olefin series resin and the previous polyethylene series resin (C) in a mass ratio of 95/5 to 50/50.

Considering the mixed resin constituting the main component of the intermediate layer (III) as 100 parts by mass, by setting the content of the polyethylene series resin (C) to 5 parts by mass or more, a decrease in the specific gravity of the film and sufficient effects to improve impact resistance and economic efficiency can be obtained. On the other hand, by setting the content of the polyethylene series resin (C) to 50 parts by mass or less, a film with excellent transparency and small natural shrinkage ratio is readily obtained, stretchability at low temperature can be maintained, and sufficient heat shrinking ratio can be obtained in a practical temperature region (on the order of 70° C. or higher but no greater than 90° C.), which is preferred.

From such points, considering the mixed resin constituting the main component of the intermediate layer (III) as 100 parts by mass, mixed resins in which the mass occupied by the cyclic olefin series resin is 50 parts by mass or more, among these, 60 parts by mass or more, and among these, 65 parts by mass or more, but no greater than 90 parts by mass, among these, no greater than 85 parts by mass, and among these, no greater than 75 parts by mass, are all the more preferred as resins constituting the main component of the intermediate layer (III) of the present embodiment. In this case, when the content occupied by the cyclic olefin series resin is set to 60 parts by mass or more, that is to say, when the content of the polyethylene series resin (C) is set to 40 parts by mass or lower, the maximum shrinking stress in the main shrinking direction of the film when immersing for 10 seconds in silicon oil at 80° C. can be readily kept at 10 MPa or lower.

It suffices that the film of the second embodiment be provided with a surface layer (I) and at least two intermediate layers (II) and (III), and it may be mediated by another layer, further, it may be suitably processed and the like, within ranges that do not prevent the function of the film of the second embodiment, and is not limited in particular. For instance, a layer with an identical composition to the surface layer (I) can be intercalated as an intermediate layer other than the intermediate layers (II) and (III). In addition, regarding the intermediate layers (II) and (III), it suffices that at least one each of the layers be included in the intermediate layers, and two or more of each layer may be included. In this case, the composition and ratio of thickness for each layer may be identical or different.

Examples of specific layer constitution include, for instance, a four layer constitution containing (I) layer/(II) layer/(III) layer/(I) layer, a five layer constitution containing (I) layer/(II) layer/(III) layer/(II) layer/(I) layer or (I) layer/(III) layer/(II) layer/(III) layer/(I) layer, other layer constitutions with more layers, and the like. The preferred lamination layer constitution in the present embodiment is the five layer constitution containing (I) layer/(II) layer/(III) layer/(II) layer/(I) layer or (I) layer/(III) layer/(II) layer/(III) layer/(I) layer, and by adopting this five layer constitution, a heat-shrinkable polyolefin series laminated film with excellent firmness (stiffness at ordinary temperature) of film, resistance to fingerprint bleaching, shrink finishability, transparency, natural shrinkage and regeneration additivity, which are problems of the present invention to be solved, and accurately separable by specific gravity, can be obtained with further improved productivity and economic efficiency. Among these, one of the preferred embodiment is a film with the five layer constitution (I) layer/(II) layer/(III) layer/(II) layer/(I) layer.

In the second embodiment, although the ratio of thickness for each layer can be set taking into consideration the effect and action of firmness of film or the like, and is not limited in particular, it is desirable that the ratio of thickness of the intermediate layer (III) with respect to the thickness of the entirety of the film is in the ranges of 25% or more, preferably 30% or more, more preferably 35% or more, and among these, 40% or more, and in particular among these, 50% or more, but no greater than 80%, preferably no greater than 75%, more preferably no greater than 70% and even more preferably no greater than 65%. If the ratio of thickness of the intermediate layer (III) with respect to the thickness of the entirety of the film is 25% or more, the firmness of film and shrinking properties are satisfactory, and the natural shrinkage can also be sufficiently inhibited. On the other hand, if the ratio of thickness is 80% or less, the transparency and shrinking stress at heat shrinking time of the film can be adjusted to an appropriate range, in addition, a decreasing in the specific gravity can be reached readily.

In addition, it is desirable that the ratio of thickness with respect to the thickness of the entirety of the film of the intermediate layer (II) is 5% or more, preferably 10% or more and more preferably 20% or more, but no greater than 50% and more preferably no greater than 40%.

From the viewpoint of exerting the function thereof, it is desirable that the surface layer (I) is in the ranges 1 μm or more, preferably 2 μm or more, and among these, 3 μm or more, but no greater than 15 μm, from the perspective that a film with excellent firmness (stiffness at ordinary temperature) of film, resistance to fingerprint bleaching, shrink finishability, transparency, natural shrinkage and regeneration additivity, and accurately separable by specific gravity can be obtained with a good balance.

It is important for the film of the second embodiment that the heat shrinking ratio upon immersion for 10 seconds in hot water at 80° C. is 20' or more in at least one of the directions, and preferably 40% or more but no greater than 70% in the main shrinking direction, or, that the heat shrinking ratio upon immersion for 10 seconds in hot water at 100° C. is 60% or more in at least one of the directions.

Such proportions of heat shrinking ratio also serve as indicators for deciding applicability to a shrinking manufacturing process in a comparatively short time (on the order of few seconds to ten and few seconds), in a PET bottle shrink labeling application or the like. That is to say, the shrink processing machine that is most used for PET bottle label fitting application in the industry currently, is one generally called a steam shrinker, which uses water vapor as a medium to carry out shrink processing, and from such point as the influence of the heat on the object to be wrapped, the heat-shrinkable film must be heat shrunk sufficiently at a temperature that is as low as possible. Taking such industrial productivity also into consideration, it can be evaluated that the film provided with the above heat shrinking ratio can come in sufficiently tight contact with the object to be wrapped within the shrink processing time.

In order for the heat shrinking ratio of a film to be in the above range, it suffices to adjust, for instance, the resin or the composition of the resin of each layer, while at the same time, making adjustments suitably according to the properties of the resin, stretching means and stretching temperature used. For instance, when an increase of heat shrinking ratio is desired, it suffices to adopt means such as increasing the content ratio of the cyclic olefin series resin contained in the surface layer (I) and/or in the intermediate layer (III), decreasing the stretching temperature, and raising the stretching ratio.

In addition, in a PET bottle shrink labeling application, the heat shrinking ratio in the direction orthogonal to the main shrinking direction of the film upon immersion of the film of the present embodiment for 10 seconds in hot water at 80° C. is preferably 10% or less, and even more preferably 7% or less. In a film with a heat shrinking ratio in the direction orthogonal to the main shrinking direction of the film of 10% or less, problems such as shortening of the dimension per se in the direction orthogonal to the main shrinking direction after shrinking, distortion and the like occurring readily in print motifs and texts after shrinking, and longitudinal shrinkage in case of angled bottles, do not occur readily, which is preferred.

In the present specification "main shrinking direction" means the direction, among the vertical direction (longer direction) and the horizontal direction (width direction), in which the heat shrinking ratio is large, and for instance, when fitting onto a bottle, it means the direction corresponding to the circumferential direction.

In addition, it is desirable that the natural shrinkage ratio of the heat-shrinkable polyolefin series laminated film of the second embodiment is as small as possible, and if the natural shrinkage ratio of the heat-shrinkable film is, for instance, less than 2.0% under the conditions of standing at 30° C. under a 50% RH atmosphere for on the order of 30 days, practical problems do not readily occur. Less than 1.5% is a more preferred ratio.

In order for the natural shrinkage ratio of the film to be less than 2.0%, for instance, it suffices to adopt methods such as using the cyclic olefin series resin with a glass transition temperature (Tg) of 50° C. or higher in the surface layer (I) and the intermediate layer (III), bringing the content of the cyclic olefin series resin to 50% by mass or more in the surface layer (I) and the intermediate layer (III), and particularly in the intermediate layer (III), and furthermore, suitably adjusting the stretching temperature according to the glass transition temperature (Tg) of the resin used in the surface layer (I) and in the intermediate layer (III), and the properties required from the heat-shrinkable film. However, the adoption is not limited to these methods. Generally, it suffices to control the stretching temperature in the ranges of about 60° C. or higher but no greater than 130° C., and preferably 70° C. or higher but no greater than 110° C.

Regarding the natural shrinkage ratio, although the surface layer (I) has the same functions as the above intermediate layer (III), in the second embodiment, the ratio of the mixed composition in the surface layer (I) is one that emphasizes the perspective of ink adhesiveness when printing onto the film.

The transparency of the film of the second embodiment in terms of total haze is, in general, preferably 101 or less, more preferably 71 or less, and even more preferably 5% or less. If the total haze of the film is 10% or less, a clear display effect can be obtained, which is preferred.

For the total haze of a film, for instance, a film with a thickness of 50 μm can be measured according to JIS K7105.

It is important that the specific gravity of the film of the second embodiment is less than 1.00, preferably 0.98 or less, and in particular 0.97 or less. In order to bring the specific gravity of the film to less than 1.00, and in particular to 0.98 or less, it suffices to adjust suitably, for instance, the content of the cyclic olefin series resin and the polyethylene series resin (A), (B) and (C) used in each layer according to the ratio of the mixed composition and the thickness constitution ratio of each layer. As the density of a cyclic olefin series resin is, in general, on the order of 0.99 g/cm$^3$ or more but no greater than 1.05 g/cm$^3$, in addition, as described above, the density of the polyethylene series resin (A) preferably used is 0.890 g/cm$^3$ or more but no greater than 0.940 g/cm$^3$, and the density of the polyethylene series resin (B) is 0.865 g/cm$^3$ or more but no greater than 0.940 g/cm$^3$, and the density of the polyethylene series resin (C) exceeds 0.935 g/cm$^3$ but is no greater than 0.970 g/cm$^3$, it suffices to design suitably by integrating these densities and contents, with the proviso that, the method for bringing the specific gravity of the film of the second embodiment to less than 1.00, and in particular to 0.98 or less, is not limited to such methods.

The specific gravity of the film of the present invention can be measured according to JIS K7112.

For the film of the second embodiment, from the point of view of firmness (stiffness at ordinary temperature) of film, the modulus of elasticity in tensile in the direction orthogonal to the main shrinking direction of the film (hereinafter also referred to as "orthogonal direction") is preferably 1200 MPa or more, more preferably 1300 MPa or more, and even more preferably 1400 MPa or more. In addition, although the upper limit of the modulus of elasticity in tensile in the orthogonal direction of the film is not limited in particular, taking into consideration the upper limit values of the modulus of elasticity in tensile of heat-shrinkable films used in general, the upper limit value is preferably on the order of 2500 MPa to 3000 MPa.

If the modulus of elasticity in tensile in the orthogonal direction of the film is 1200 MPa or more, the firmness (stiffness at ordinary temperature) of the entirety of the film being high, in particular, even when the thickness of the film is thinned down, problematic points, such as, the yield decreasing readily when using a labeling machine and the like to cover a container such as a PET bottle with a film formed into a bag, due to the bottle being covered skewedly, creasing of the film, and the like, do not arise readily, which is preferred.

In order to bring the modulus of elasticity in tensile of the film of the second embodiment to 1200 MPa or more, it suffices to adjust suitably, for instance, the contents of the cyclic olefin series resin and polyethylene series resins (A), (B) and (C) used, according to the ratio of the mixed composition and the thickness constitution ratio of each layer. In particular, in the present embodiment, it is desirable that the ratio of thickness of the intermediate layer (III) containing the polyethylene series resin (C) with respect to the thickness of the entirety of the film is 40% or more but no greater than 80%, and preferably 50% or more but no greater than 70%, with the proviso that the method for bringing the modulus of elasticity in tensile in the orthogonal direction of the film of the second embodiment to 1200 MPa or more is not limited to such methods.

For the film of the second embodiment, the preferred maximum shrinking stress in the main shrinking direction of the film when immersed for 10 seconds in silicon oil at 80° C. is 10 MPa or less, preferably 8 MPa or less, and more preferably 6 Mpa or less. On the other hand, the lower limit of the maximum shrinking stress in the main shrinking direction of the film is preferably 0.5 MPa or more, from the point of view of bottle maintaining tight contactness with heat-shrinkable film. If the maximum shrinking stress in the main shrinking direction of the film is 10 MPa or less, when label fitting with a steam shrinker, the shrink finishability is satisfactory, as film sites with different shrinking behaviors with respect to temperature irregularities inside the shrinker do not appear readily, such that irregularities, wrinkles, pockmarks and the like, do not occur readily.

In order to adjust the above maximum shrinking stress in the main shrinking direction of the film to 10 MPa or less, it is important to adjust the resin composition of each layer to the range defined in the second embodiment. In particular, it is important to bring the mixing mass ratio of the polyethylene series resin (C) to 40 parts by mass or less in the resin composition constituting the intermediate layer (III) (see the above description of the constitution of the polyethylene series resin (C)). In addition, it is adequate to control the stretching temperature (although this needs to be modified according to the glass transition temperature of the resin composition used or the properties required from the heat shrinking film) in a range of about 60° C. or higher but no greater than 130° C., and preferably 70° C. or higher but no greater than 110° C. (see the following description of the film manufacturing method).

The resistance to rupture of the film of the second embodiment is evaluated by tensile elongation, in a tension test under an environment of 23° C. and 0° C., and in the label application in particular, the elongation ratio in the pulling (flowing) direction (machine direction: MD) of the film is 100% or more, preferably 200% or more, and more preferably 300% or more.

Although the film of the second embodiment is not limited in particular, in general, the thickness is 20 µm or more, and preferably 30 µm or more but no greater than 80 µm, and preferably no greater than 70 µm. If the thickness of the film is 20 µm or more, the handling ability of the film is satisfactory, on the other hand, if it is no greater than 80 µm, transparency and shrink processability are excellent, which is also economically preferred. In addition, as necessary, surface treatments and surface processing, such as corona treatment, printing, coating and vapor deposition, furthermore, bag forming processing by various solvents and heat sealing, perforation processing and the like can be carried out.

(Method for Manufacturing a Film)

The films of the first embodiment and second embodiment can be manufactured by suitably modifying the conditions in conventionally well known manufacturing methods, and the manufacturing method is not limited in particular.

Although the morphology of the films of the first embodiment and the second embodiment is not limited in particular, and any among a planar shape and a tubular shape is adequate, from such points of view as productivity (possibility of multiple slitting in the width direction of the whole film into products) and the possibility to print on the inner surface, a planar shape morphology is preferred.

For instance, a method whereby through the steps of melting the resins to be used in each layer using a plurality of extruders, co-extruding from a T die, solidifying by cooling on a chilled roll, roll stretching in the longitudinal direction, tenter stretching in the horizontal direction, then, annealing, cooling, and, as necessary, treating by corona discharge, and the like, a film stretched in one axial or two axial directions is manufactured, can be cited as an example of method for manufacturing a planar shape film. In addition, a method whereby a film manufactured by the tubular method is cut open to manufacture a planar shape film is also applicable.

Herein, although the extrusion molding temperature is adjusted suitably according to the resin and, the flowing characteristic, the membrane forming properties, and the like of the resin, a range of no greater than about 260° C., preferably 200° C. or higher but no greater than 250° C. is preferred.

In addition, as cyclic olefin series resins easily develop spots such as fish eyes due to shearing and the like during extrusion, using methods such as starve feed extrusion or extruding by adding a lubricant coating and the like, is preferred.

Although the stretching temperature needs to be modified suitably according to the resin used, the glass transition temperature (Tg) of the resin, and the properties required of the heat-shrinkable film, it is controlled in the range of about 60° C. or higher but no greater than 130° C., preferably 70° C. or higher but no greater than 110° C.

In addition, stretching ratio is determined suitably according to the resin used and the properties of the resin, stretching means, stretching temperature, target product morphology and the like, with a range of 1,5-fold or more but no greater than 10-fold in the main shrinking direction, preferably 3-fold or more but no greater than 7-fold, in one axial or two axial directions. In addition, even when stretching uniaxially in the horizontal direction, with such objective as improving the mechanical and physical properties of the film, and the like, it is also effective to apply a weak stretching of on the order of 1.05-fold or more but no greater than 1.80-fold in the longitudinal direction.

Next, after heat treatment and relaxation treatment are carried out at a temperature of on the order of 50° C. or higher but no greater than 100° C. as necessary with such objectives as decreasing the natural shrinkage ratio and improving heat shrinking characteristics, the stretched film is cooled rapidly within a period of time where the molecular orientation is not attenuated, to become a heat-shrinkable film.

(Heat-shrinkable Label)

Although the films of the first embodiment and the second embodiment can be used in various applications, preferably, they can form heat-shrinkable labels fitted onto glass containers or plastic containers such as PET bottles by forming a print layer on one side or on both sides of the film. In this case, from the point of view of separation during recovery-regeneration, bringing the specific gravity of the heat-shrinkable label to less than 1.00 is preferred.

Generally, a print layer is formed on the surface and/or the reverse side of a heat-shrinkable film used in label application, on the entirety of the surface and/or partially, by a well known method such as gravure printing, flexo printing, offset printing and bar coater.

The printing ink used to form the print layer formation is not limited in particular, can be selected suitably according to the previous printing methods, and, for instance, solvent (non-water based) or water based acrylic resin series and urethane resin series inks, expandable inks, heat expandable inks and the like can be cited.

Currently, the density of a print layer formed through printing and drying processes conventionally carried out is greater than 1.05 g/cm$^3$, and for instance, the density of a print layer formed by silver color ink, which is broadly used in the label application, is 1.55 g/cm$^3$, and the density of a print layer formed by white ink is on the order of 1.40 g/cm$^3$.

In addition, although the thickness of the print layer provided in the label application is not limited in particular, it is generally on the order of 0.1 µm or more but no greater than 10 µm, in case of gravure printing.

From the above, in order to bring the specific gravity of a heat-shrinkable label onto which the print layer has been formed to less than 1.00, which is a specific gravity enabling accurate specific gravity separation in the specific gravity separation process of PET bottles and the like, the specific gravity of the heat shrinkable laminated film of the present invention is more preferably 0.98 or less, and in particular 0.97 or less.

The labels of the first embodiment and the second embodiment are subjected to wrapping by processing from a flat shape into a cylindrical shape, or the like, by the object to be wrapped. Regarding those containers with a cylindrical shape requiring printing, such as PET bottles, first printing the required image onto one side of a wide flat film that has been rolled into a roll, and while cutting this to the required width, folding this so that the printed side is inside, and center sealing (shape of the sealing portion is a so-called envelope seal) to give the film a cylindrical shape, is sufficient.

For the center seal method, although sealing methods by organic solvent, methods using heat sealing, methods using adhesive, and methods using impulse sealer exist, when the visual quality of the external appearance is taken into consideration, sealing methods with organic solvent are preferred.

The above organic solvent is preferably a mixed solvent system of a good solvent that causes dissolution or swelling of the cyclic olefin series resin, which is the main component of the surface layer (I), relatively easily at ordinary temperatures, and a poor solvent that causes no dissolution obviously, but also no swelling. The reason is, the mixing ratio of both parties can be suitably changed, which suitably changes the solubility, allowing for an easy handling of adhesion that is adequate for the running speed of the center sealing process, and the like.

Examples of the previous good solvent include aliphatic cyclic ethers, such as, tetrahydrofuran (THF) and tetrahydropyran, and linear or cyclic aliphatic hydrocarbons with on the order of 5 or more but no greater than 10 carbons, such as, pentane, heptane, cyclohexane and cyclooctane. On the other hand, examples of poor solvent include aliphatic ketones, such as, dimethyl ketone and diethyl ketone, in addition, aliphatic alcohols, such as, methyl acetate and ethyl acetate, furthermore, cyclic ethylene dioxides, such as, 1,3-dioxolane and 1,4-dioxane, and the like.

(Molded Products and Containers)

As the films of the first embodiment and second embodiment have excellent mechanical strengths, such as, firmness (stiffness at ordinary temperature) of film, resistance to fingerprint bleaching, shrink finishability, transparency, regeneration additivity, and the like, and have small natural shrinkage and shrinking stress, when fitting onto molded products or containers, even for molded products or containers with complex shapes (for instance, a cylinder with a central neck, square prism, pentagonal prism, hexagonal prism and the like, presenting angles) they can be borough into tight contact with the shapes, and can be fitted beautifully without wrinkles, pockmarks and the like. Thus, examples of target object for fitting the films of the first embodiment and second embodiment onto include molded products or containers having various shapes, such as, for instance, jars, bottles (blow molded bottles), trays, lunchboxes, grocery containers and dairy product containers. In particular, when the films of the first embodiment and second embodiment are used as shrinkable labels for food containers (for instance, PET bottles and glass jars for soft drink use or food use, and preferably PET bottles), they particularly excel on the point that they can be brought in tight contact with the shapes, yielding containers fitted with beautiful labels without wrinkles, pockmarks and the like, even if the shapes are as complex as above.

In addition to heat-shrinkable label material for plastic containers, the films of the first embodiment and second embodiment can be suitably used as heat-shrinkable label materials for packages (containers) using as construction materials at least one species chosen from, for instance, metal, porcelain, glass, paper, polyolefin series resins such as polyethylene, polypropylene and polybutene, polymethacrylic acid ester series resins, polycarbonate series resins, polyester series resins such as polyethylene terephthalate and polybutylene terephthalate, and polyamide series resins, which are materials having coefficients of thermal expansion, water absorption properties, and the like, that are extremely different from the heat-shrinkable films of the first embodiment and second embodiment.

Examples of materials constituting a plastic container body that can use the films of the first embodiment and second embodiment include, in addition to the above resins, polystyrene, rubber-modified impact resistant polystyrene (HIPS), styrene-butylacrylate copolymer, styrene-acrylonitrile copolymer, styrene-maleic anhydride copolymer, acrylonitrile-butadiene-styrene copolymer (ABS), methacrylic acid ester-butadiene-styrene copolymer (MBS), polyvinyl chloride series resin, phenol resin, urea resin, melamine resin, epoxy resin, unsaturated polyester resin, silicone resin, and the like. These plastic containers may be a mixture or stacked layers of two or more species of resins. The films of the first embodiment and second embodiment can be used suitably in particular as label application of containers containing polyester series resins such as polyethylene terephthalate, with a specific gravity of 1.00 or above, such as PET bottles.

EXAMPLES

Hereinafter, the content of the present invention will be further described with examples. However, the present invention is not limited in any way to these examples.

A variety of measurements and evaluations on the films shown in the present specifications were carried out as described below. Herein, the direction of the film flow from the extruder is referred to as the "longitudinal direction", and the direction orthogonal thereto is referred to as the "horizontal direction".

(1) Glass Transition Temperature (Tg) A sample was cut out to a size of 4 mm in the longitudinal direction×60 mm in the horizontal direction, measurements in the horizontal direction were carried out using the viscoelasticity spectrometer DVA-200 (manufactured by IT Keisoku Co., Ltd.), at an oscillation frequency of 10 Hz, a distortion of 0.1%, a heating rate of 3° C./minute, a chuck spacing of 25 mm, and a temperature range −50° C. to 150° C., the peak value of the loss elastic modulus (E") was determined from the data obtained, and the temperature at that time served as the glass transition temperature (Tg).

(2) Crystal Melting Peak Temperature (Tm)

The crystal melting peak temperature (Tm) was determined from the thermogram obtained when 10 mg of sample was heated from −40° C. to 200° C. at a heat velocity of 10° C./minute, retained at 200° C. for one minute, then, cooled to −40° C. with a cooling velocity of 10° C./minute, retained at −40° C. for one minute, and heated again with a heat velocity 10° C./minute, according to JIS K7121, using DSC-7 manufactured by PerkinElmer, Inc.

(3) Heat Shrinking Ratio

Samples with a size of 100 mm in the longitudinal direction×100 mm in the horizontal direction were cut out from the obtained heat-shrinkable film, immersed in a hot water bath at 70° C. to 100° C. for 10 seconds, the amounts of shrinkage in the main shrinking direction (horizontal direction) of the film were measured, and the ratios of the amount of shrinkage with respect to the original size prior to shrinking were determined as percentage values.

For Examples 1 to 3 and Comparative Examples 1 to 4, the heat shrinking ratios were determined by immersing in a hot water bath at 80° C. for 10 seconds each. For Examples 4 to 7 and Comparative Examples 5 to 7, the heat shrinking ratios were determined by immersing in a hot water bath at each temperature of 70° C., 80° C. and 90° C. for 10 seconds each. For Examples 8 to 13 and Comparative Examples 8 to 13, the heat shrinking ratios were determined by immersing in a hot water bath at 80° C. and 100° C. for 10 seconds each.

(4) Shrinking Stress

The heat-shrinkable films obtained in Examples 8 to 13 and Comparative Examples 8 to 13 were cut out to a size of 10 mm in the longitudinal direction×70 mm in the horizontal direction, chucked with a spacing of 50 mm, and secured to the load cell so that there was no sagging. Thereafter, a sample piece was immersed for 10 seconds in a silicon oil bath at 80±0.5° C., and the maximum shrinking stress in the horizontal direction (film main shrinking direction) was measured in the meantime. The shrinking stress was calculated by plugging into the following formula:

Shrinking stress=stress exerted on the load cell/cross-section of sample piece.

In addition, the results of the evaluations performed with the following criteria were also reported.

(double circle): those with a shrinking stress of less than 6 MPa (circle): those with a shrinking stress of 6 MPa or more but less than 8 MPa (triangle): those with a shrinking stress of 8 MPa or more but no greater than 10 MPa (cross): those with a shrinking stress exceeding 10 MPa (5) Natural Shrinkage Ratio A sample with a size of 100 mm in the longitudinal direction×1000 mm in the horizontal direction was cut out from the heat-shrinkable film obtained, let to stand for 30 days in a constant temperature and humidity chamber with an atmosphere of 50% RH at 30° C., the amount of shrinkage with respect to the original size prior to shrinking was measured in the horizontal direction (main shrinking direction of the film), and the ratio thereof was determined in percent value.

(6) Haze

The total haze of a film with a thickness of 50 μm was measured according to JIS K7105.

(7) Specific Gravity of Film

Measured according to JIS K7112 for the heat-shrinkable film obtained.

(8) Modulus of Elasticity in Tensile

Measured according to JIS K7127, in the direction orthogonal to the main shrinking direction (longitudinal direction) of a heat-shrinkable film obtained under the temperature condition of 23° C. In addition, the results of the evaluations performed with the following criteria were also reported.

(double circle): those with a modulus of elasticity in tensile of 1400 MPa or more (circle): those with a modulus of elasticity in tensile of 1200 MPa or more but less than 1400 MPa (cross): those with a modulus of elasticity in tensile of less than 1200 MPa (9) Elongation at Break Measured according to JIS K7127 under the conditions of 23° C. temperature and 200 mm/minute test velocity, in the longitudinal direction (direction orthogonal to the film main shrinking direction) of a heat-shrinkable film obtained.

(10) Low Temperature Elongation at Break

Measured according to JIS K7127 under the conditions of 0° C. temperature and 100 mm/minute or 200 mm/minute test velocity, in the longitudinal direction (direction orthogonal to the film main shrinking direction) of heat-shrinkable films obtained in Examples 4 to 13 and Comparative Examples 5 to 13.

The measurements for Examples 4 to 7 and Comparative Examples 5 to 7 were carried out under the conditions of 0° C. temperature and 200 mm/minute test velocity, and the measurements for Examples 8 to 13 and Comparative Examples 8 to 13 were carried out under the conditions of 0° C. temperature and 100 mm/minute test velocity.

(11) Resistance to Fingerprint Bleaching

A sample with a size of 100 mm in the longitudinal direction×100 mm in the horizontal direction was cut out from the heat-shrinkable film obtained, fingerprint (oil from hand) was applied onto the film surface, the sample was immersed for 10 seconds in a hot water bath at 80° C., then, the state of the fingerprinted portion was visually evaluated and reported with the following criteria:

(circle): those where bleaching or crack in the fingerprinted portion is not noticeable (cross): those where bleaching or crack in the fingerprinted portion is noticeable For the Examples 8 to 13 and Comparative Examples 8 to 13, the report used the following criteria:

(circle): those with absolutely no bleaching (crack) in the fingerprinted portion (triangle): those where bleaching (crack) in the fingerprinted portion is not noticeable (cross): those where bleaching (crack) in the fingerprinted portion is noticeable

(12) Shrink Finishability

A heat-shrinkable film printed with a grid spaced by 10 mm vertically and horizontally was cut out to a size of 100 mm in the longitudinal direction×298 mm in the horizontal direction, the two edges in the horizontal direction were overlapped by 10 mm, and solvent sealed to form a cylindrical shape. This cylindrically shaped film was fitted onto a round-shaped PET bottle with an internal volume of 1.5 liters, and passed through a three meter-long steam heating type shrinking tunnel in 10 seconds without rotation. The blowing steam temperature was 99° C., the temperature of the atmosphere inside the tunnel was in the range of 90° C. or higher but no greater than 94° C. After enveloping with the film, shrink finishability was evaluated according to the following criteria:

(circle): those with sufficient shrinking, no wrinkling and no pockmarks, no practical problem posed by distortion of the grid, and with satisfactory tight contactness of film (cross): those with clearly insufficient shrinking portions, or with noticeable wrinkling, pockmarks, and grid distortions For the Examples 8 to 13 and Comparative Examples 8 to 13, the reports were according to the following criteria.

(circle): those with sufficient shrinking, no wrinkling and no pockmarks, no practical problem posed by distortion of the grid, and satisfactory tight contactness of film (triangle): those with sufficient shrinking, some wrinkling and pockmark, but with no practical problem posed by distortion of the grid, and also with satisfactory tight contactness of film (cross): those with clearly insufficient shrinking portions, or with noticeable wrinkling, pockmarks, and grid distortions

(13) Printing Label Specific Gravity

After printing the entirety of the surface (solid printing) on one side of the heat-shrinkable films obtained in Examples 4 to 13 and Comparative Examples 5 to 13 with a gravure ink (manufactured by Dainichiseika Co., Ltd.; trade name: OS-M65 White) at a bar coater (#4), drying was carried out at a temperature of 23° C. for 24 hours, a printing label having an ink coat film with a density of 1.40 g/cm$^3$ and a thickness of 3 μm was obtained. Measurements were carried out according to JIS K7112 using this printing label.

(14) Storage Modulus (E')

A sample was cut out to 4 mm vertically and 60 mm horizontally, measurements in the longitudinal direction were carried out using the viscoelasticity spectrometer DVA-200 (manufactured by IT Keisoku Co., Ltd.), from −50° C. to 150° C., at an oscillation frequency of 10 Hz, a distortion of 0.1%, a heating rate of 3° C./minute and a chuck spacing of 25 mm, and the value of the storage modulus (E') at 25° C. was determined from the data obtained.

Example 1

A heat-shrinkable polyolefin series laminated film with a three-layer structure containing (I) layer/(III) layer/(I) layer was manufactured.

As shown in Table 1, a resin composition serving as a surface layer (I), wherein 0.1 parts by mass of an oxidation inhibitor (manufactured by CIBA Specialty Chemicals; trade name: Irganox 1010) was added to 100 parts by mass of a mixed resin composition of 70% by mass of an ethylene-norbornene random copolymer (manufactured by Ticona; trade name: Topas 9506; Tg: 71° C.; MFR: 1.3 g/10 min) (hereinafter abbreviated as "cyclic PO1") serving as a cyclic olefin series resin and 30% by mass of a linear low density polyethylene resin (manufactured by Ube Industries, Ltd.; trade name: UMERIT 0540F; density: 0.904 g/cm$^3$; Tm: 111° C.; MFR (JIS K7210; temperature: 190° C.; load: 21.18N; hereinafter, unless specified otherwise in particular, the conditions for MFR measurements were identical): 4.0 g/10 min) (hereinafter abbreviated as "PE1") serving as a polyethylene series resin (A), and a resin composition serving as an intermediate layer (III) containing 100% by mass of a cyclic olefin open-ring (co)polymer (manufactured by Zeon Corporation; trade name: ZEONOR 750R; Tg: 75° C.; MFR: 1.1 g/10 min) (hereinafter abbreviated as "cyclic PO3") serving as a cyclic olefin series resin, were respectively fed into separate uniaxial extruders, melted and mixed at a set temperature of 240° C., then, extruded from a three layer die so that the thickness of each layer was surface layer (I)/intermediate layer (III)/reverse side layer (I)=1/8/1, pulled out with a cast roll at 50° C., and solidified by cooling to obtain an unstretched laminated sheet with a width of 300 mm and a thickness of 200 μm.

Next, after stretching four-fold in a single horizontal axial direction inside a tenter stretching equipment at a preheating temperature of 110° C. and a stretching temperature of 84° C., the sheet was rapidly cooled with cold air to obtain a heat-shrinkable polyolefin series laminated film with a thickness of 50 μm.

This film was evaluated and the results are shown in Table 1. In addition, an overall evaluation was carried out with a (circle) for a film presenting no problem in all the evaluation items, and a (cross) for a film presenting even a single problem.

Example 2

As shown in Table 1, a heat-shrinkable polyolefin series laminated film was obtained similarly to Example 1, except that a mixed resin composition of 70% by mass of cyclic PO1 and 30% by mass of PE1 was a component of the surface layer (I), and a mixed resin composition of 70% by mass of cyclic PO1 serving as cyclic olefin series resin and 30% by mass of a high density polyethylene resin (manufactured by Mitsui Chemicals; trade name: HIZEX HZ2200J; density: 0.964 g/cm$^3$; Tm: 136° C.; MFR: 5.2 g/10 min) (hereinafter abbreviated as "PE4") serving as polyethylene series resin (C) was a component of the intermediate layer (III). This film was evaluated and the results are shown in Table 1.

Example 3

As shown in Table 1, a heat-shrinkable polyolefin series laminated film was obtained similarly to Example 1, except that a mixed resin composition containing 54' by mass of cyclic P01 and 36% by mass of PE4, and 10% by mass of hydrogenated petroleum resin (manufactured by Arakawa Chemical Industries, Ltd.; trade name: Arkon P125; softening temperature: 125° C.) (hereinafter abbreviated as "petroleum resin") serving as hydrocarbon resins were used instead of a resin composition containing cyclic PO3 serving as a component of the intermediate layer (III) in Example 1. This film was evaluated and the results are shown in Table 1.

Comparative Example 1

As shown in Table 1, a heat-shrinkable polyolefin series laminated film was obtained similarly to Example 1, except that the mixed resin composition containing cyclic PO1 and PE1 used as a component of the surface layer (I) in Example 2 was changed to a resin containing 1000% by mass of cyclic PO1. This film was evaluated and the results are shown in Table 1.

Comparative Example 2

As shown in Table 1, a heat-shrinkable polyolefin series laminated film was obtained similarly to Example 1, except that the mass ratios in the mixed resin composition containing cyclic PO1 and PE1 used as a component of the surface layer (I) in Example 2 were changed to 40% by mass of cyclic P01 and 60% by mass of PE1. This film was evaluated and the results are shown in Table 1.

Comparative Example 3

As shown in Table 1, a heat-shrinkable polyolefin series laminated film was obtained similarly to Example 1, except that the mixed resin composition containing cyclic PO1 and PE4 used as a component of the intermediate layer (III) in Example 2 was changed to a resin containing 100% by mass of PE1. This film was evaluated and the results are shown in Table 1.

Comparative Example 4

As shown in Table 1, the preparation was carried out similarly to Example 1 except that the mass ratios in the mixed resin composition containing cyclic PO1 and PE4 used as a component of the intermediate layer (III) in Example 2 was changed to 30' by mass of cyclic PO1 and 70% by mass of PE4. However, stretching could not be carried out due to film rupture.

TABLE 1

|  |  | Examples | | | Comparative Examples | | | |
|---|---|---|---|---|---|---|---|---|
|  |  | 1 | 2 | 3 | 1 | 2 | 3 | 4 |
| Surface layer | cyclic PO1 | 70 | 70 | 70 | 100 | 40 | 70 | 70 |
| (I) | PE1 | 30 | 30 | 30 |  | 60 | 30 | 30 |
| (% by mass) | PE4 |  |  |  |  |  |  |  |
| Intermediate | cyclic PO1 |  | 70 | 54 | 70 | 70 |  | 30 |

TABLE 1-continued

|  |  | Examples | | | Comparative Examples | | | |
|---|---|---|---|---|---|---|---|---|
|  |  | 1 | 2 | 3 | 1 | 2 | 3 | 4 |
| layer (III) (% by mass) | cyclic PO3 | 100 |  |  |  |  |  |  |
|  | PE1 |  |  |  |  |  | 100 |  |
|  | PE4 |  | 30 | 36 | 30 | 30 |  | 70 |
|  | petroleum resins |  |  | 10 |  |  |  |  |
| [Evaluation Result] | | | | | | | | |
| Haze (%) |  | 3.8 | 4.3 | 3.9 | 2.5 | 15.2 | 4.1 | Non-stretchable |
| Specific gravity (−) |  | 1.00 | 0.98 | 0.98 | 0.99 | 0.98 | 0.92 |  |
| Storage modulus (E') (MPa) |  | 1690 | 1905 | 1924 | 2027 | 1780 | 334 |  |
| Elongation at break (%) |  | 178 | 243 | 212 | 180 | 261 | 746 |  |
| Natural shrinkage ratio (%) |  | 1.0 | 1.3 | 1.4 | 0.9 | 2.1 | 8.7 |  |
| Heat shrinking ratio at 80° C. (%) |  | 59.6 | 57.2 | 57.8 | 58.3 | 52.4 | 12.4 |  |
| Resistance to fingerprint bleaching |  | ◯ | ◯ | ◯ | X | ◯ | ◯ |  |
| Shrink finishability |  | ◯ | ◯ | ◯ | ◯ | ◯ | X |  |
| Overall evaluation |  | ◯ | ◯ | ◯ | X | X | X | X |

From Table 1, the heat-shrinkable polyolefin series laminated film defined in the present invention was found to have excellent firmness (stiffness at ordinary temperature) of film, resistance to fingerprint bleaching, shrink finishability, transparency and natural shrinkage (Example 1). In addition, when the resin composition for the intermediate layer (III) was changed to a mixed resin composition of cyclic olefin series resin and polyethylene series resin (C), the firmness (stiffness at ordinary temperature) of film, resistance to fingerprint bleaching, shrink finishability, transparency and natural shrinkage were found to be excellent, while at the same time, a decrease of the specific gravity of the entirety of the film was also achieved (Examples 2 and 3). In contrast, in regard to the resin composition of the surface layer (I), when the polyethylene series resin (A) was not mixed, the resistance to fingerprint bleaching was found to be poor (Comparative Example 1). In addition, when a large quantity of polyethylene series resin (A) was mixed in proportions outside the ranges defined by the present invention, transparency was found to be poor (Comparative Example 2). Next, in regard to the resin composition of the intermediate layer (III), when only a polyethylene series resin (A) was used without using a cyclic olefin series resin, although the decrease of the specific gravity of the film was satisfactory, firmness (stiffness at ordinary temperature) of film, shrink finishability, natural shrinkage, and the like, were found to be poor (Comparative Example 3). In addition, when a large quantity of polyethylene series resin (C) was mixed in proportions outside the ranges defined by the present invention, stretching at low temperature was found to be difficult.

Example 4

A heat-shrinkable polyolefin series laminated film with a five-layer structure containing (I) layer/(II) layer/(III) layer/(II) layer/(I) layer was manufactured.

As shown in Table 2, a component of the surface layer (I) was a resin composition, wherein 0.1 parts by mass of an oxidation inhibitor (manufactured by CIBA Specialty Chemicals; trade name: Irganox 1010) was added to 100 parts by mass of a mixed resin composition of 70% by mass of an ethylene-norbornene random copolymer (manufactured by Ticona; trade name: Topas 9506; Tg: 71° C.; MFR (JIS K7210; temperature: 190° C.; load: 21.18N; hereinafter, unless specified otherwise in particular, the conditions for MFR measurements were identical): 1.3 g/10 min) (hereinafter abbreviated as "cyclic PO1") serving as a cyclic olefin series resin and 30% by mass of a linear low density polyethylene resin (manufactured by Ube Industries, Ltd.; trade name: UMERIT 0540F; density: 0.904 g/cm$^3$; Tm: 111° C.; MFR 4.0 g/10 min) (hereinafter abbreviated as "PE1") serving as a polyethylene series resin (A), a component of the intermediate layer (II) was a straight low density polyethylene (manufactured by Mitsui Chemicals; trade name: evolueSP2540, density: 0.923 g/cm$^3$, Tm: 123° C., MFR: 4.0 g/min) (hereinafter abbreviated as "PE2") serving as a polyethylene series resin (B), and a component of the intermediate layer (III) was a mixed resin composition of 60' by mass of cyclic P01 serving as a cyclic olefin series resin and 40% by mass of high density polyethylene resin (manufactured by Mitsui Chemicals; trade name: HIZEX HZ2200J, density: 0.964 g/cm$^3$, Tm: 136° C., MFR: 5.2 g/10 min) (hereinafter abbreviated as "PE4") serving as a polyethylene series resin (C).

The components of each layer were respectively fed into separate uniaxial extruders, melted and mixed at a set temperature of 240° C., then, extruded from a three layer die so that the thickness of each layer was (I) layer/(II) layer/(III) layer/(II) layer/(I) layer=20 μm/20 μm/120 μm/20 μm/20 μm, pulled out with a cast roll at 50° C., and solidified by cooling to obtain an unstretched laminated sheet with a width of 300 mm and a thickness of 200 μm. Next, after stretching fourfold in a single horizontal axial direction inside a tenter stretching equipment at a preheating temperature of 110° C. and a stretching temperature of 84° C., the sheet was rapidly cooled with cold air to obtain a heat-shrinkable polyolefin series laminated film with a thickness of 50 μm.

The obtained film was evaluated and the results are shown in Table 2. In addition, an overall evaluation was carried out with a (circle) for a film presenting no problem in all the evaluation items, and a (cross) for a film presenting even a single problem.

Example 5

As shown in Table 2, a heat-shrinkable polyolefin series laminated film was obtained similarly to Example 4, except that the thickness of each layer prior to stretching in Example 4 was changed to (I) layer/(II) layer/(III) layer/(II) layer/(I) layer=15 μm/35 μm/100 μm/35 μm/15 μm. The obtained film was evaluated and the results are shown in Table 2.

Example 6

As shown in Table 2, a heat-shrinkable polyolefin series laminated film was obtained similarly to Example 4, except that the mass ratios in the mixed resin composition containing cyclic PO1 and PE1 used for the surface layer (I) in Example 4 were changed to 60% by mass of cyclic PO1 and 401 by mass of PE1, and the thickness of each layer prior to stretching was changed to (I) layer/(II) layer/(III) layer/(II) layer/(I) layer=13 μm/47 μm/80 μm/47 μm/13 μm. The obtained film was evaluated and the results are shown in Table 2.

Example 7

As shown in Table 2, a heat-shrinkable polyolefin series laminated film was obtained similarly to Example 4, except that the mass ratios in the mixed resin composition containing cyclic PO1 and PE4 used for the intermediate layer (III) in Example 4 were changed to 80% by mass of cyclic PO1 and 20% by mass of PE4. The obtained film was evaluated and the results are shown in Table 2.

Comparative Example 5

As shown in Table 2, a heat-shrinkable polyolefin series laminated film was obtained similarly to Example 4, except that the mixed resin composition containing cyclic PO1 and PE1, and the mass ratio thereof, used for the surface layer (I) in Example 4 was changed to 100' by mass of cyclic PO1. The obtained film was evaluated and the results are shown in Table 2.

Comparative Example 6

As shown in Table 2, a heat-shrinkable polyolefin series laminated film was obtained similarly to Example 4, except that the thickness of each layer prior to stretching in Example 4 was changed substantially to a two-species, three-layer constitution of (I) layer/(II) layer/(III) layer/(II) layer/(I) layer=34 μm/66 μm/0 μm/66 μm/34 μm. The obtained film was evaluated and the results are shown in Table 2.

Comparative Example 7

As shown in Table 2, the preparation was carried out similarly to Example 4, except that the mass ratios in the mixed resin composition containing cyclic P01 and PE4 used for the intermediate layer (III) in Example 4 were changed to 30% by mass of cyclic P01 and 70% by mass of PE4. However, stretching could not be carried out due to film rupture.

TABLE 2

|  |  | Examples |  |  |  | Comparative Examples |  |  |
|---|---|---|---|---|---|---|---|---|
|  |  | 4 | 5 | 6 | 7 | 5 | 6 | 7 |
| (I) layer (% by mass) | cyclic PO1 | 70 | 70 | 60 | 70 | 100 | 70 | 70 |
|  | PE1 | 30 | 30 | 40 | 30 | 0 | 30 | 30 |
| (II) layer (% by mass) | PE2 | 100 | 100 | 100 | 100 | 100 | 100 | 100 |
| (III) layer (% by mass) | cyclic PO1 | 60 | 60 | 60 | 80 | 60 | — | 30 |
|  | PE4 | 40 | 40 | 40 | 20 | 40 |  | 70 |
| [Evaluation Result] |  |  |  |  |  |  |  |  |
| Haze (%) |  | 3.6 | 3.7 | 4.8 | 3.7 | 2.5 | 3.1 | Non-stretchable |
| Specific gravity of film (−) |  | 0.97 | 0.96 | 0.95 | 0.96 | 0.97 | 0.94 |  |
| Modulus of elasticity in tensile (MPa) |  | 1612 ◎ | 1442 ◎ | 1238 ○ | 1408 ◎ | 1513 ◎ | 799 X |  |
| Elongation at break (%) |  | 242 | 254 | 293 | 265 | 256 | 412 |  |
| Low temperature elongation at break (%) |  | 228 | 229 | 269 | 232 | 237 | 388 |  |
| Natural shrinkage ratio (%) |  | 0.9 | 1.2 | 1.3 | 0.9 | 0.9 | 1.9 |  |
| Heat shrinking ratio (%) | 70° C. | 6.0 | 6.1 | 6.5 | 5.9 | 6.5 | 7.5 |  |
|  | 80° C. | 56.4 | 47.0 | 46.4 | 48.2 | 48.1 | 38.6 |  |
|  | 90° C. | 61.3 | 57.2 | 59.2 | 63.8 | 58.7 | 47.0 |  |
| Resistance to fingerprint bleaching |  | ○ | ○ | ○ | ○ | X | ○ |  |
| Shrink finishability |  | ○ | ○ | ○ | ○ | ○ | ○ |  |
| Label specific gravity (−) |  | 0.99 | 0.98 | 0.97 | 0.98 | 0.99 | 0.96 |  |
| Overall evaluation |  | ○ | ○ | ○ | ○ | X | X | X |

From Table 2, the heat-shrinkable polyolefin series laminated film defined in the present invention was found to have excellent firmness (stiffness at ordinary temperature) of film, resistance to fingerprint bleaching, shrink finishability, transparency and natural shrinkage, and was able to achieve a decrease of the specific gravity (Examples 4 to 7). In contrast, in regard to the resin composition of the surface layer ((I) layer), when the polyethylene series resin (A) was not mixed, the resistance to fingerprint bleaching was found to be poor (Comparative Example 5). Next, when the film does not have an intermediate layer ((III) layer) containing a mixed resin composition of cyclic olefin series resin and polyethylene series resin (C), although a decrease of the specific gravity could be achieved, the firmness (stiffness at ordinary temperature; here, modulus of elasticity in tensile) of film was found to be poor (Comparative Example 6). In addition, in regard to the resin composition of the intermediate layer ((III) layer), when a large quantity of polyethylene series resin (C) was mixed in proportions outside the ranges defined by the present invention, stretching at low temperature was found to be difficult (Comparative Example 7).

Example 8

A heat-shrinkable polyolefin series laminated film with a five-layer structure containing (I) layer/(II) layer/(III) layer/ (II) layer/(I) layer was manufactured.

As shown in Table 3, a component of the surface layer (I) was a resin composition, wherein 0.1 parts by mass of an oxidation inhibitor (manufactured by CIBA Specialty Chemicals; trade name: Irganox 1010) was added to 100 parts by mass of a mixed resin composition of 70% by mass of an ethylene-norbornene random copolymer (manufactured by Ticona; trade name: Topas 9506; Tg: 71° C.; MFR (JIS K7210; temperature: 190° C.; load: 21.18N; hereinafter, unless specified otherwise in particular, the conditions for MFR measurements were identical): 1.3 g/10 min) (hereinafter abbreviated as "cyclic PO1") serving as a cyclic olefin series resin and 30% by mass of a linear low density polyethylene resin (manufactured by Ube Industries, Ltd.; trade name: UMERIT 0540F; density: 0.904 g/cm$^3$; Tm: 111° C.; MFR 4.0 g/10 min) (hereinafter abbreviated as "PE1") serving as a polyethylene series resin (A).

A component of the intermediate layer (II) was a straight low density polyethylene (manufactured by Mitsui Chemicals; trade name: evolueSP2540, density: 0.923 g/cm$^3$, Tm: 123° C., MFR: 4.0 g/min) (hereinafter abbreviated as "PE2") serving as a polyethylene series resin (B).

A component of the intermediate layer (III) was a mixed resin composition of 70' by mass of cyclic PO1 serving as a cyclic olefin series resin and 30% by mass of high density polyethylene resin (manufactured by Mitsui Chemicals; trade name: HIZEX HZ2200J, density: 0.964 g/cm$^3$, Tm: 136° C., MFR: 5.2 g/lomin) (hereinafter abbreviated as "PE4") serving as a polyethylene series resin (C).

The components of each layer were respectively fed into separate uniaxial extruders, melted and mixed at a set temperature of 240° C., then, extruded from a three layer die so that the thickness of each layer was (I) layer/(II) layer/(III) layer/(II) layer/(I) layer=10 μm/40 μm/100 μm/40 μm/10 μm, pulled out with a cast roll at 50° C., and solidified by cooling to obtain an unstretched laminated sheet with a width of 300 mm and a thickness of 200 μm. Next, after stretching fourfold in a single horizontal axial direction inside a tenter stretching equipment at a preheating temperature of 110° C. and a stretching temperature of 84° C., the sheet was rapidly cooled with cold air to obtain a heat-shrinkable polyolefin series laminated film with a thickness of 50 μm.

The obtained film was evaluated and an overall evaluation was carried out with a (circle) for a film presenting no problem in all the evaluation items, and a (cross) for a film presenting even a single problem. The results are shown in Table 4.

Example 9

As shown in Table 3, a heat-shrinkable polyolefin series laminated film was obtained by a similar method to Example 8, except that a low density polyethylene (manufactured by Japan Polyethylene Corporation; trade name: Novatec LD LC600A; density: 0.918 g/cm$^3$; Tm: 106° C.; MFR: 7.0 g/10 min) (hereinafter abbreviated as "PE3") was used as the polyethylene series resin (B) used for the intermediate layer (II) in Example 8. The obtained film was evaluated and the results are shown in Table 4.

Example 10

As shown in Table 3, a heat-shrinkable polyolefin series laminated film was obtained by a similar method to Example 8, except that the mass ratios in the mixed resin containing cyclic PO1 and PE1 used for the surface layer (I) in Example 8 were changed to 40 parts by mass of PE1 with respect to 60 parts by mass of cyclic PO1, and that two parts by mass of liquid polybutene (Japan polybutene LV100, manufactured by Nippon Oil Co., Ltd.; molecular weight: 500) (hereinafter abbreviated as "low molecular compound") were added with respect to 100 parts by mass of mixed resin containing cyclic PO0 and PE4 used for the intermediate layer (III). The obtained film was evaluated and the results are shown in Table 4.

Example 11

As shown in Table 3, a heat-shrinkable polyolefin series laminated film was obtained by a similar method to Example 8, except that two parts by mass of low molecular compound were added with respect to 100 parts by mass of mixed resin containing cyclic PO0 and PE1 used for surface layer (I) in Example 8. The obtained film was evaluated and the results are shown in Table 4.

Example 12

As shown in Table 3, a heat-shrinkable polyolefin series laminated film was obtained by a similar method to Example 8, except that the mass ratios in the mixed resin containing cyclic PO1 and PE1 used for the surface layer (I) in Example 8 were changed to 20 parts by mass of PE1 with respect to 80 parts by mass of cyclic PO1, the cyclic PO1 used in the intermediate layer (III) was changed to an ethylene-norbornene random copolymer (manufactured by Ticona; trade name: Topas 8007, Tg: 79° C., MFR (JIS K7210; temperature: 190° C.; load: 21.18N; hereinafter, unless specified otherwise in particular, the conditions for MFR measurements were identical): 1.1 g/10 min) (hereinafter abbreviated as "cyclic PO2"), and that four parts by mass of liquid polybutene (Japan polybutene LV100, manufactured by Nippon Oil Co., Ltd.; molecular weight: 500) (hereinafter abbreviated as "low molecular compound") were added with respect to 100 parts by mass of a mixed resin containing cyclic PO2 and PE4. The obtained film was evaluated and the results are shown in Table 4.

Example 13

As shown in Table 3, a heat-shrinkable polyolefin series laminated film was obtained by a similar method to Example 8, except that the mass ratios of cyclic P01 and PE4 used for the intermediate layer (III) in Example 8 were changed to 25 parts by mass of PE4 with respect to 75 parts by mass of cyclic PO1. The obtained film was evaluated and the results are shown in Table 4.

Comparative Example 8

As shown in Table 3, a heat-shrinkable polyolefin series laminated film was obtained by a similar method to Example 8, except that the resin constituting the surface layer (I) in Example 8 was changed to a resin containing cyclic PO1 only. The obtained film was evaluated and the results are shown in Table 4.

Comparative Example 9

A heat-shrinkable polyolefin series laminated film was obtained by a similar method to Example 8, except that the thickness of each layer prior to stretching in Example 8 was substantially changed to a two-species, three-layer constitution of (I) layer/(II) layer/(III) layer/(II) layer/(I) layer=34 μm/66 μm/0 μm/66 μm/34 μm (i.e. (I) layer/(II) layer/(I) layer=34 μm/132 μm/34 μm). The obtained film was evaluated and the results are shown in Table 4.

Comparative Example 10

As shown in Table 3, a heat-shrinkable polyolefin series laminated film was obtained by a similar method to Example 8, except that the mass ratios in the mixed resin containing cyclic PO1 and PE4 used for the intermediate layer (III) in Example 8 were changed to 55 parts by mass of PE4 with respect to 45 parts by mass of cyclic PO1. The obtained film was evaluated and the results are shown in Table 4.

Comparative Example 11

As shown in Table 3, a heat-shrinkable polyolefin series laminated film was obtained by a similar method to Example 8, except that PE4 was used alternatively to PE1 as the polyethylene series resin (A) used for the surface layer (I) in Example 8. The obtained film was evaluated and the results are shown in Table 4.

Comparative Example 12

As shown in Table 3, a heat-shrinkable polyolefin series laminated film was obtained by a similar method to Example 8, except that PE1 was used alternatively to PE4 as the polyethylene series resin (C) used for the surface layer (III) in Example 8. The obtained film was evaluated and the results are shown in Table 4.

Comparative Example 13

As shown in Table 3, a film was created by a similar method to Example 8, except that PE4 was used alternatively to PE2 as the polyethylene series resin (B) used for the surface layer (II) in Example 8. However, stretching could not be carried out as the film ruptured and no heat-shrinkable film could be obtained.

TABLE 3

|  |  | Examples |  |  |  |  |  | Comparative Examples |  |  |  |  |  |
|---|---|---|---|---|---|---|---|---|---|---|---|---|---|
|  |  | 8 | 9 | 10 | 11 | 12 | 13 | 8 | 9 | 10 | 11 | 12 | 13 |
| (I) layer (mass ratio) | cyclic PO1 | 70 | 70 | 60 | 70 | 80 | 70 | 100 | 70 | 70 | 70 | 70 | 70 |
|  | PE1 | 30 | 30 | 40 | 30 | 20 | 30 |  | 30 | 30 |  | 30 | 30 |
|  | PE4 |  |  |  |  |  |  |  |  |  | 30 |  |  |
|  | low molecular compound |  |  |  | 2 |  |  |  |  |  |  |  |  |
| (II) layer (mass ratio) | PE2 | 100 |  | 100 | 100 | 100 | 100 | 100 | 100 | 100 | 100 | 100 |  |
|  | PE3 |  | 100 |  |  |  |  |  |  |  |  |  |  |
|  | PE4 |  |  |  |  |  |  |  |  |  |  |  | 100 |
| (III) layer (mass ratio) | cyclic PO1 | 70 | 70 | 70 | 70 |  | 75 | 70 | — | 45 | 70 | 70 | 70 |
|  | cyclic PO2 |  |  |  |  | 70 |  |  |  |  |  |  |  |
|  | PE1 |  |  |  |  |  |  |  |  |  |  | 30 |  |
|  | PE4 | 30 | 30 | 30 | 30 | 30 | 25 | 30 |  | 55 | 30 |  | 30 |
|  | low molecular compound |  |  |  | 2 |  | 4 |  |  |  |  |  |  |

TABLE 4

|  | Examples |  |  |  |  |  | Comparative Examples |  |  |  |  |  |
|---|---|---|---|---|---|---|---|---|---|---|---|---|
|  | 8 | 9 | 10 | 11 | 12 | 13 | 8 | 9 | 10 | 11 | 12 | 13 |
| Heat shrinking ratio at 80° C. (%) | 45.3 | 44.5 | 46.7 | 44.7 | 47.1 | 43.5 | 45.5 | 44.4 | 32 | 45.5 | 46.0 | Non-stretchable |
| Heat shrinking ratio at 100° C. (%) | 63.3 | 62.2 | 63.7 | 63.6 | 63.1 | 65.8 | 64.5 | 66.4 | 42.3 | 63.3 | 66.6 |  |
|  | ○ | ○ | ◎ | ○ | ◎ | ◎ | ◎ | ◎ | X | ○ | ◎ |  |
| Shrinking stress (MPa) | 7.6 | 7.2 | 5.8 | 7.2 | 6.4 | 6.2 | 7.8 | 2.3 | 14.2 | 7.7 | 5.2 |  |
|  | ○ | ○ | ◎ | ○ | ○ | ○ | ○ | ◎ | X | ○ | ◎ |  |
| Natural shrinkage ratio (%) | 1.4 | 1.4 | 1.6 | 1.4 | 1.3 | 0.9 | 1.1 | 1.9 | 2.6 | 1.4 | 1.1 |  |
| Haze (%) | 3.6 | 3.7 | 4.8 | 5.1 | 4.2 | 3.7 | 2.5 | 3.1 | 5.2 | 22.1 | 7.1 |  |
| Specific gravity of film (−) | 0.97 | 0.97 | 0.96 | 0.97 | 0.97 | 0.97 | 0.97 | 0.94 | 1 | 0.97 | 0.96 |  |
| Modulus of elasticity in tensile (MPa) | 1397 | 1442 | 1378 | 1350 | 1238 | 1391 | 1458 | 799 | 1430 | 1402 | 928 |  |
|  | ○ | ◎ | ○ | ○ | ○ | ○ | ◎ | X | ◎ | ◎ | X |  |
| Elongation at break (%) | 274 | 254 | 293 | 248 | 255 | 234 | 227 | 412 | 266 | 261 | 321 |  |

TABLE 4-continued

| | Examples | | | | | | Comparative Examples | | | | | |
| --- | --- | --- | --- | --- | --- | --- | --- | --- | --- | --- | --- | --- |
| | 8 | 9 | 10 | 11 | 12 | 13 | 8 | 9 | 10 | 11 | 12 | 13 |
| Low temperature elongation at break (%) | 231 | 229 | 242 | 221 | 210 | 187 | 211 | 388 | 232 | 221 | 281 | |
| Resistance to fingerprint bleaching | ○ | ○ | ○ | ○ | ○ | ○ | X | ○ | ○ | ○ | ○ | |
| Shrink finishability | ○ | ○ | ○ | ○ | ○ | ○ | ○ | ○ | X | ○ | ○ | |
| Label specific gravity (−) | 0.99 | 0.99 | 0.99 | 0.99 | 0.99 | 0.99 | 0.99 | 0.96 | 1 | 0.99 | 0.99 | |
| Overall evaluation | ○ | ○ | ○ | ○ | ○ | ○ | X | X | X | X | X | X |

From Table 3 and Table 4, the film of the present invention was found to have shrinking properties, shrinking stress, firmness (stiffness at ordinary temperature) of film, resistance to fingerprint bleaching and transparency that were all excellent, and was able to achieve a decrease of the specific gravity (Examples 8 to 13). In contrast, in regard to the resin of surface layer (I), when the polyethylene series resin (A) was not mixed, the resistance to fingerprint bleaching was found to be poor (Comparative Example 8). In addition, when the film does not have an intermediate layer (III) containing a mixed resin composition of cyclic olefin series resin and polyethylene series resin (C), although a decrease of the specific gravity could be achieved, the firmness (stiffness at ordinary temperature; here, modulus of elasticity in tensile) of film was found to be poor (Comparative Example 9). In addition, in regard to the resin composition of the intermediate layer (III), when a large quantity of polyethylene series resin (C) was mixed in proportions outside the ranges defined by the present invention, the shrinking properties were found to decrease (Comparative Example 10). In addition, in regard to the polyethylene series resins (A) and (B) contained in the surface layer (I) and the intermediate layers (II) and (III), for those that were outside the ranges defined in the present invention, decreasing the haze value and the modulus of elasticity in tensile, and stretching at low temperature were found to be difficult (Comparative Examples 11 to 13).

INDUSTRIAL APPLICABILITY

As the film of the present invention is a film with excellent shrinking properties, resistance to fingerprint bleaching, firmness (stiffness at ordinary temperature) of film and transparency, with decreased natural shrinkage and shrinking stress, it can be used as a heat-shrinkable label and as a plastic container fitted with said label.

What is claimed is:

1. A heat-shrinkable polyolefin series laminated film, comprising at least five layers, including two surface layers (I), plus at least three intermediate layers formed from intermediate layer (II) and intermediate layer (III), wherein said film has a heat shrinking ratio upon immersion in hot water at 80° C. for 10 seconds of 20% or more in the main shrinking direction of the film, and further wherein each said layer (I), (II), and (III) comprises as a main component the following constituents:

Surface layer (I): a mixed resin of a cyclic olefin series resin and a polyethylene series resin (A) in a mass ratio of 90/10 to 50/50;

Intermediate layer (II): a polyethylene series resin (B) whose crystal melting peak temperature (Tm) is no greater than 125° C., as measured with a differential scanning calorimeter (DSC); and Intermediate layer (III): a cyclic olefin series resin, wherein said film comprises a layer arrangement of (I) layer/(II) layer/(III) layer/(II) layer/(I) layer or (I) layer/(III) layer/(II) layer/(III) layer/(I) layer.

2. The heat-shrinkable polyolefin series laminated film as recited in claim 1, wherein any one layer, or two or more layers among said surface layer (I), intermediate layer (II) and intermediate layer (III) further comprise a molecular compound (D) in a proportion of one part by mass or more but no greater than 15 parts by mass with respect to 100 parts by mass of resin constituting each layer.

3. The heat-shrinkable polyolefin series laminated film as recited in claim 2, wherein said low molecular compound (D) is at least one species selected from the group consisting of liquid polybutene, liquid polybutadiene, liquid polyisoprene, liquid hydrogenated polybutadiene, liquid hydrogenated polyisoprene and liquid paraffin.

4. The heat-shrinkable polyolefin series laminated film as recited in claim 1, wherein the specific gravity is less than 1.00.

5. The heat-shrinkable polyolefin series laminated film as recited in claim 1, wherein the specific gravity is 0.98 or less.

6. The heat-shrinkable polyolefin series laminated film as recited in claim 1, wherein the specific gravity is 0.97 or less.

7. A heat-shrinkable label comprising the heat-shrinkable polyolefin series laminated film as recited in claim 1 and a printer layer formed on one side or both sides of the film, the specific gravity of the label being less than 1.00 after the print layer has been formed.

8. A unit comprising the heat-shrinkable label as recited in claim 7 and a container fitted with the label.

9. A heat-shrinkable polyolefin series laminated film, comprising at least five layers, including two surface layers (I), plus at least three intermediate layers formed from intermediate layer (II) and intermediate layer (III), wherein each said layer (I), (II), and (III) comprises as a main component the following constituents:

Surface layer (I): a mixed resin of a cyclic olefin series resin and a polyethylene series resin (A) with a crystal melting peak temperature (Tm) of 80° C. or higher but no greater than 125° C., as measured with a differential scanning calorimeter (DSC), in a mass ratio of 90/10 to 50/50;

Intermediate layer (II): a polyethylene series resin (B) whose crystal melting peak temperature (Tm) is no greater than 125° C., as measured with a differential scanning calorimeter (DSC); and Intermediate layer (III): a mixed resin of a cyclic olefin series resin and a polyethylene series resin (C), whose crystal melting peak temperature (Tm) exceeds 125° C. but is no greater than 140° C., as measured with a differential scanning calorimeter (DSC), in a mass ratio of 95/5 to 50/50, wherein said film comprises a layer arrangement of (I) layer/(II) layer/(III) layer/(II) layer/(I) layer or (I) layer/(III) layer/(II) layer/(III) layer/(I) layer.

10. The heat-shrinkable polyolefin series laminated film as recited in claim 9, wherein the crystal melting peak temperature (Tm) of the polyethylene series resin (A) is 90° C. or higher but no greater than 125° C., as measured with a differential scanning calorimeter (DSC).

11. The heat-shrinkable polyolefin series laminated film as recited in claim 9, wherein any one layer, or two or more layers among said surface layer (I), intermediate layer (II) and intermediate layer (III) further comprise a molecular compound (D) in a proportion of one part by mass or more but no greater than 15 parts by mass with respect to 100 parts by mass of resin constituting each layer.

12. The heat-shrinkable polyolefin series laminated film as recited in claim 9, wherein the specific gravity is less than 1.00.

13. The heat-shrinkable polyolefin series laminated film as recited in claim 9, wherein the specific gravity is 0.98 or less.

14. The heat-shrinkable polyolefin series laminated film as recited in claim 9, wherein the specific gravity is 0.97 or less.

15. A heat-shrinkable label comprising the heat-shrinkable polyolefin series laminated film as recited in claim 9 and a printer layer formed on one side or both sides of the film, the specific gravity of the label being less than 1.00 after the print layer has been formed.

16. A unit comprising the heat-shrinkable label as recited in claim 15 and a container fitted with the label.

17. A heat-shrinkable polyolefin series laminated film, comprising at least five layers, including two a surface layers (I), plus at least three intermediate layers formed from intermediate layer (II) and intermediate layer (III), wherein said film has heat shrinking ratio upon immersion in hot water at 100° C. for 10 seconds of 60% or more in the main shrinking direction of the film, and a maximum shrinking stress in the main shrinking direction of the film upon immersion in silicon oil at 80° C. for 10 seconds of 10 MPa or less, and further wherein each said layer (I), (II), and (III) comprises as a main component the following constituents:

Surface layer (I): a mixed resin of cyclic olefin series resin and a polyethylene series resin (A) with a crystal melting peak temperature (Tm) of 80° C. or higher but no greater than 125° C., as measured with a differential scanning calorimeter (DSC), in a mass ratio of 90/10 to 50/50;

Intermediate layer (II): a polyethylene series resin (B) with a crystal melting peak temperature (Tm) of no greater than 125° C., as measured with a differential scanning calorimeter (DSC); and Intermediate layer (III): a mixed resin of a cyclic olefin series resin and a polyethylene series resin (C) with a crystal melting peak temperature (Tm) exceeding 125° C. but no greater than 140° C., as measured with a differential scanning calorimeter (DSC), in a mass ratio of 90/10 to 60/40, wherein said film comprises a layer arrangement of (I) layer/(II) layer/(III) layer/(II) layer/(I) layer or (I) layer/(III) layer/(II) layer/(III) layer/(I) layer.

18. The heat-shrinkable polyolefin series laminated film as recited in claim 17, wherein the ratio of thickness of said intermediate layer (III) is 25% or more but no greater than 75% with respect to the thickness of the entirety of the film.

19. The heat-shrinkable polyolefin series laminated film as recited in claim 17, wherein the ratio of thickness of said intermediate layer (III) is 35% or more but no greater than 75% with respect to the thickness of the entirety of the film.

20. The heat-shrinkable polyolefin series laminated film as recited in claim 17, wherein modulus of elasticity in tensile is 1200 MPa or more in the direction orthogonal to the main shrinking direction of the film, as measured according to JIS K7127.

21. The heat-shrinkable polyolefin series laminated film as recited in claim 17, wherein any one layer, or two or more layers among said surface layer (I), intermediate layer (II) and intermediate layer (III) further comprise a molecular compound (D) in a proportion of one part by mass or more but no greater than 15 parts by mass with respect to 100 parts by mass of resin constituting each layer.

22. The heat-shrinkable polyolefin series laminated film as recited in claim 17, wherein the specific gravity is less than 1.00.

23. The heat-shrinkable polyolefin series laminated film as recited in claim 17, wherein the specific gravity is 0.98 or less.

24. The heat-shrinkable polyolefin series laminated film as recited in claim 17, wherein the specific gravity is 0.97 or less.

25. A heat-shrinkable label comprising the heat-shrinkable polyolefin series laminated film as recited in claim 17 and a printer layer formed on one side or both sides of the film, the specific gravity of the label being less than 1.00 after the print layer has been formed.

26. A unit comprising the heat-shrinkable label as recited in claim 25 and a container fitted with the label.

\* \* \* \* \*